United States Patent
D'Souza et al.

(10) Patent No.: US 10,235,552 B2
(45) Date of Patent: Mar. 19, 2019

(54) HYBRID CAPACITIVE AND ULTRASONIC SENSING

(71) Applicant: QUALCOMM Incorporated, San Diego, CA (US)

(72) Inventors: Sandeep Louis D'Souza, San Diego, CA (US); Vadim Winebrand, San Diego, CA (US); Ashish Hinger, Sunnyvale, CA (US); Paul Penchin Pan, San Diego, CA (US); Meir Agassy, Ramat Gan (IL); Yizhaq Abudi, Even Yehuda (IL); Micah Timothy Lawrence, San Diego, CA (US); Jong Soo Kim, San Diego, CA (US); Sherman Sebastian Antao, San Diego, CA (US); Bo-Ren Wang, San Diego, CA (US); Masoud Roham, San Diego, CA (US); Lennart Karl Mathe, San Diego, CA (US); Nathan Felix Altman, San Diego, CA (US); Suryaprakash Ganti, Los Altos, CA (US); David William Burns, San Jose, CA (US)

(73) Assignee: QUALCOMM Incorporated, San Diego, CA (US)

(*) Notice: Subject to any disclaimer, the term of this patent is extended or adjusted under 35 U.S.C. 154(b) by 66 days.

(21) Appl. No.: 15/633,164

(22) Filed: Jun. 26, 2017

(65) Prior Publication Data

US 2018/0101711 A1  Apr. 12, 2018

Related U.S. Application Data

(60) Provisional application No. 62/407,386, filed on Oct. 12, 2016.

(51) Int. Cl.
  G06K 9/00 (2006.01)
  G06F 21/32 (2013.01)
  G06K 9/22 (2006.01)

(52) U.S. Cl.
  CPC .......... *G06K 9/0002* (2013.01); *G06F 21/32* (2013.01); *G06K 9/228* (2013.01)

(58) Field of Classification Search
  None
  See application file for complete search history.

(56) References Cited

U.S. PATENT DOCUMENTS

| 9,323,393 B2 | 4/2016 | Djordjev et al. |
| 2014/0210781 A1 | 7/2014 | Stern |

(Continued)

FOREIGN PATENT DOCUMENTS

WO  WO-2015127335 A2  8/2015

OTHER PUBLICATIONS

Anonymous: "Apple Motion Coprocessors—Wikipedia", Oct. 4, 2016, XP055414733, Retrieved from the Internet: URL:https://en.wikipedia.org/w/index.php?title=Apple motion_ coprocessors &oldid= 742644135 , 4 pages.

(Continued)

*Primary Examiner* — Hadi Akhavannik
(74) *Attorney, Agent, or Firm* — Weaver Austin Villeneuve & Sampson LLP—QUAL

(57) ABSTRACT

Systems, methods and apparatus for configuring a fingerprint sensor to operate in a capacitive sensing mode and an ultrasonic sensing mode are disclosed. A fingerprint sensor may be configured to operate in a capacitive sensing mode by driving a sensing electrode using a controller. In some implementations, an object positioned on or near the sensing electrode may be detected using the fingerprint sensor in the capacitive sensing mode, and the controller can drive elec- (Continued)

trodes of the fingerprint sensor differently to configure the fingerprint sensor to operate in an ultrasonic sensing mode. In some implementations, an applications processor may be instructed to authenticate a fingerprint of the object from image data obtained when the fingerprint sensor is operating in the ultrasonic sensing mode. In some implementations, a display of a mobile device containing the fingerprint sensor may be unlocked, or the mobile device may be woken up when the fingerprint is authenticated.

21 Claims, 28 Drawing Sheets

(56) References Cited

U.S. PATENT DOCUMENTS

| | | | |
|---|---|---|---|
| 2014/0354597 A1* | 12/2014 | Kitchens, II | G06F 1/3215 |
| | | | 345/175 |
| 2015/0241393 A1* | 8/2015 | Ganti | G01N 29/09 |
| | | | 73/589 |
| 2016/0171281 A1 | 6/2016 | Park et al. | |

OTHER PUBLICATIONS

International Search Report and Written Opinion—PCT/US2017/048270—ISA/EPO—dated Oct. 20, 2017.

\* cited by examiner

HYBRID CAPACITIVE AND ULTRASONIC SENSING

PRIORITY DATA

This disclosure claims priority to U.S. Provisional Patent Application No. 62/407,386 by D'Souza, et al., filed on Oct. 12, 2016 and entitled HYBRID CAPACITIVE AND ULTRASONIC SENSING, which is hereby incorporated by reference in its entirety and for all purposes.

TECHNICAL FIELD

This disclosure relates to electronic device wakeup based on capacitive and ultrasonic sensing.

DESCRIPTION OF THE RELATED TECHNOLOGY

In an ultrasonic sensor system, an ultrasonic transmitter may be used to send an ultrasonic wave through an ultrasonically transmissive medium or media and towards an object to be detected. The transmitter may be operatively coupled with an ultrasonic sensor configured to detect portions of the ultrasonic wave that are reflected from the object. For example, in ultrasonic fingerprint imagers, an ultrasonic pulse may be produced by starting and stopping the transmitter during a very short interval of time. At each material interface encountered by the ultrasonic pulse, a portion of the ultrasonic pulse is reflected.

For example, in the context of an ultrasonic fingerprint imager, the ultrasonic wave may travel through a platen on which a person's finger may be placed to obtain a fingerprint image. After passing through the platen, some portions of the ultrasonic wave encounter skin that is in contact with the platen, e.g., fingerprint ridges, while other portions of the ultrasonic wave encounter air, e.g., valleys between adjacent ridges of a fingerprint, and may be reflected with different intensities back towards the ultrasonic sensor. The reflected signals associated with the finger may be processed and converted to a digital value representing the signal strength of the reflected signal. When multiple such reflected signals are collected over a distributed area, the digital values of such signals may be used to produce a graphical display of the signal strength over the distributed area, for example by converting the digital values to an image, thereby producing an image of the fingerprint. Thus, an ultrasonic sensor system may be used as a fingerprint imager or other type of biometric scanner. In some implementations, the detected signal strength may be mapped into a contour map of the finger that is representative of the depth of the ridge structure detail.

Inadvertent wakeup of a mobile device due to non-finger objects in contact with or near the mobile device can lead to unwanted battery drain, battery life reduction and sometimes an awkward placement of phone calls or initiation of other functions unintended by an authorized user. In other situations, wakeup of the mobile device may be hindered in difficult environments such as exposure to frost, dew, rain, fog, pools, spas, hot tubs, showers or full immersion of the mobile device in water. Wet, sweaty or partially wet fingers with local droplets of water may also hinder device wakeup.

SUMMARY

The examples of systems, methods, computer readable media and devices of this disclosure each have several innovative aspects, no single one of which is solely responsible for the desirable attributes disclosed herein.

In some aspects, a system includes a fingerprint sensor having one or more sensing electrodes and a controller. The controller may be configured to provide one or more first drive signals to the one or more sensing electrodes to configure the fingerprint sensor in a capacitive sensing mode, and provide one or more second drive signals to the one or more sensing electrodes to configure the fingerprint sensor in an ultrasonic sensing mode. The one or more second drive signals may be different from the one or more first drive signals.

In some implementations, the controller includes an amplifier configured to provide the one or more second drive signals in the ultrasonic sensing mode. The amplifier may be configured to be in a high-impedance state in the capacitive sensing mode, wherein such an impedance state denotes operating the amplifier with an output impedance greater than the output impedance of the amplifier in the ultrasonic sensing mode. In some implementations, the controller is further configured to configure the fingerprint sensor to operate in the ultrasonic sensing mode based on the fingerprint sensor detecting a touch in the capacitive sensing mode. In some implementations, a mobile device housing the fingerprint sensor is configured to wake up from a sleep mode responsive to the fingerprint sensor detecting the touch in the capacitive sensing mode and in the ultrasonic sensing mode. In some implementations, a mobile device housing the fingerprint sensor is configured to wake up from a sleep mode responsive to the fingerprint sensor detecting the touch in the capacitive sensing mode and an authorized fingerprint in the ultrasonic sensing mode. In some implementations, a mobile device housing the fingerprint sensor is configured to allow a user greater access to device data, programs, or capabilities responsive to the fingerprint sensor detecting the touch in the capacitive sensing mode and an authorized fingerprint in the ultrasonic sensing mode.

In some implementations, the controller is further configured to provide, to an applications processor configured to perform fingerprint authentication, an interrupt signal representing that a finger corresponding to the touch is detected by the fingerprint sensor in the capacitive sensing mode. In some implementations, the controller is further configured to determine a touch detection threshold, which may be based at least in part on a contact area of a finger in contact with the fingerprint sensor. The touch detection threshold may be adjusted during a fingerprint authentication process.

In some implementations, the controller is further configured to report a finger lift event while operating in either the capacitance sensing mode or the ultrasonic sensing mode. In some implementations, the controller is further configured to determine a temperature corresponding to the fingerprint sensor. The detection of the touch in the capacitive sensing mode may be based at least in part on the temperature.

In some implementations, the controller includes circuitry to generate a buffered first drive signal provided to at least one sensing electrode of the fingerprint sensor when the fingerprint sensor is in the capacitive sensing mode. In some implementations, the fingerprint sensor includes one or more piezoelectric micromechanical ultrasonic transducers (PMUTs), one or more capacitive micromachined ultrasonic transducers (CMUTs), one or more layers of polyvinylidene fluoride (PVDF), or one or more layers of polyvinylidene fluoride-trifluoroethylene (PVDF-TrFE).

In some implementations, sensing electrodes of the fingerprint sensor include a first electrode and a second electrode. The first electrode, such as a touchscreen electrode, is electrically coupled to the controller to provide a first signal to operate the fingerprint sensor in the capacitive sensing mode. The second electrode is electrically coupled to the controller to provide a second signal to operate the fingerprint sensor in the ultrasonic fingerprint sensing mode. The first electrode and the second electrode may be positioned under a cover glass of a mobile device, around the perimeter of a mobile device, under a back cover of a mobile device, or under a display of a display device, by way of example. In some implementations, the display of the display device indicates a position of the fingerprint sensor when a finger touch is detected in the capacitive sensing mode or the ultrasonic sensing mode. In some implementations, the display of the display device indicates a recommendation of a position at which a user may place their finger. The first electrode and/or the second electrode may be configured to detect a finger gesture.

In some implementations, the controller may configure the one or more sensing electrodes in the ultrasonic sensing mode upon indication of a change in motion or a change in orientation from an in-device accelerometer or an in-device gyroscope, wherein "in-device" denotes that the accelerometer or gyroscope is housed within the same encompassing device as the controller is, such as where a controller and an accelerometer are housed within the same handset In some implementations, the controller may be configured to adjust a finger detection rate in the capacitive sensing mode or the ultrasonic sensing mode upon indication of a change in motion or a change in orientation from an in-device accelerometer or an in-device gyroscope. In some implementations, the controller may be configured to adjust a touch detection threshold upon indication of a change in motion or a change in orientation from an in-device accelerometer or an in-device gyroscope. In some implementations, the controller may be configured to detect an acoustically generated piezoelectric signal in the capacitive sensing mode. For instance, the acoustically generated piezoelectric signal may originate from a tap, a rub or an acoustic emission from a finger.

In some aspects, a method for configuring a fingerprint sensor includes configuring, by a controller, the fingerprint sensor to function in a capacitive sensing mode; determining that an object has touched a sensing electrode using the fingerprint sensor in the capacitive sensing mode; configuring, by the controller, the fingerprint sensor to function in an ultrasonic sensing mode; determining that the object that has touched the sensing electrode is a finger using the fingerprint sensor in the ultrasonic sensing mode; and instructing an applications processor to wake up and to authenticate a fingerprint of the finger.

In some implementations, configuring the fingerprint sensor to function in the ultrasonic sensing mode includes driving an amplifier to provide a drive signal to an electrode of the fingerprint sensor and configuring the amplifier to operate in a high-impedance state in the capacitive sensing mode. Instructing the applications processor to authenticate the fingerprint may include asserting an interrupt signal representing that the object is determined to be a finger using the fingerprint sensor in the ultrasonic sensing mode. In some implementations, the method may further include returning to a home screen or unlocking a display of a mobile device when the fingerprint of the finger has been authenticated.

In some implementations, the method may include causing additional features of the systems described above to be carried out.

In some aspects, a non-transitory computer readable medium stores instructions executable by one or more processors of a controller to cause a method to be performed for configuring a fingerprint sensor. The instructions may be configured so the method includes configuring the fingerprint sensor to function in a capacitive sensing mode; determining that an object has touched a sensing electrode using the fingerprint sensor in the capacitive sensing mode; configuring the fingerprint sensor to function in an ultrasonic sensing mode; determining that the object that has touched the sensing electrode is a finger using the fingerprint sensor in the ultrasonic sensing mode; and instructing an applications processor to authenticate a fingerprint of the finger. In some implementations, the method may further include returning to a home screen or waking up a mobile device when the fingerprint of the finger has been authenticated.

In some implementations, the instructions may be configured to cause additional features of the systems and/or methods described above to be carried out.

BRIEF DESCRIPTION OF THE DRAWINGS

Details of one or more implementations of the subject matter described in this specification are set forth in the accompanying drawings and the description below. Other features, aspects and advantages will become apparent from the description, drawings and claims. Note that the relative dimensions of the following figures may not be drawn to scale.

Like reference numbers and designations in the various drawings indicate like elements.

DETAILED DESCRIPTION

Figure 1:
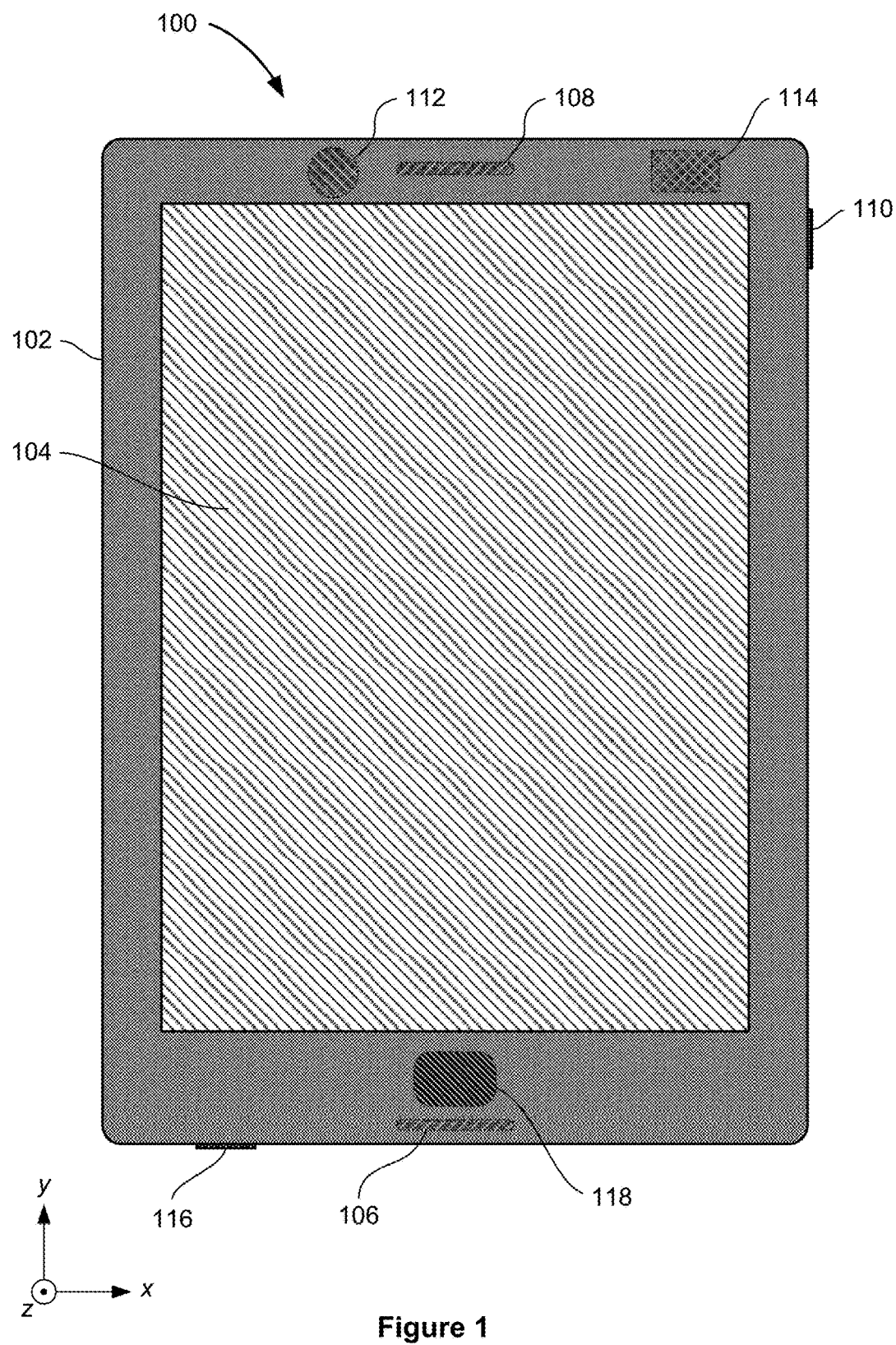
FIG. 1 shows a front view of a diagrammatic representation of an example mobile device that includes an ultrasonic sensing system according to some implementations.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, apparatus or system that includes a biometric system as disclosed herein for ultrasonic sensing. In addition, it is contemplated that the described implementations may be included in or associated with a variety of electronic devices such as, but not limited to: mobile telephones, multimedia Internet enabled cellular telephones, mobile television receivers, wireless devices, smartphones, smart cards, wearable devices such as bracelets, armbands, wristbands, rings, headbands and patches, etc. Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), mobile health devices, computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, automatic teller machines (ATMs), parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also can be used in applications such as, but not limited to, electronic switching devices, radio frequency filters, sensors, accelerometers, gyroscopes, motion-sensing devices, magnetometers, inertial components for consumer electronics, parts of consumer electronics products, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

Electronic devices, such as smartphones, tablets and wearable devices, may be in a low-power mode of operation in which the display screen and applications processor may be turned off or in a low-power stand-by mode. In some configurations, the device may be "woken up" and come out of the low-power stand-by or off mode by pressing a dedicated on/off button or by detecting a finger (i.e., any of the digits of the hand, including the thumb, the fleshy part of the thumb near the thumb basal joint, and the palm) on a biometric button associated with the mobile device or by touching a capacitance-based touchscreen with a finger. Fingers can be detected via capacitive sensing, which includes measuring a change in capacitance in a circuit to detect a touch (e.g., a finger touching or swiping the touchscreen). However, objects other than a finger (e.g., a metal tabletop, objects in a purse or pocket, a cheek of a user, etc.) on the touchscreen may also result in a change in capacitance. These other objects may create a false positive determination that a finger has touched the touchscreen, resulting in the applications processor and the display of the touchscreen to turn on when they should remain off. Moreover, a finger touching the touchscreen should be that of the owner. That is, the applications processor and display of the touchscreen should turn on (e.g., unlock the device) when a finger of the owner is detected rather than other objects or fingers of other people. Turning on the applications processor and display of the touchscreen may result in a high current consumption. As a result, false positives may drain the battery of the device.

In some implementations, a two-step capacitance sensing and ultrasonic sensing method may be performed to "wake up" an application processor which may include turning on a display or other portions of a mobile device, entering a higher power-consumption mode, or entering a mode which provides greater access to software, data, information related to an authenticated user, or device capabilities. For example, a fingerprint sensor may be configured to operate in a capacitive sensing mode to detect a touch and operate in an ultrasonic sensing mode to detect whether the touch is from a finger. In some implementations, the same electrode (or electrodes) of the fingerprint sensor may be used in both the capacitive sensing and ultrasonic sensing modes. In some implementations, one or more sensing electrodes of or associated with the fingerprint sensor may be configured to operate in the capacitive sensing mode and one or more other sensing electrodes may be configured to operate in the ultrasonic sensing mode. In some implementations, a full array of piezoelectric sensor pixels or a smaller subset of sensor pixels in the fingerprint sensor may be used when operating in the ultrasonic sensing mode. Accordingly, the fingerprint sensor may first be configured to operate in the capacitive sensing mode and if a touch is detected then the fingerprint sensor may be configured next to operate in the ultrasonic sensing mode to determine whether the touch is from a finger. A controller may include controller circuitry and one or more controller circuits to provide different sets of one or more drive signals to the electrode (or electrodes) such that the same fingerprint sensor may switch operation between the two modes. If the touch is from a finger, the controller circuit may provide an interrupt signal as a flag or trigger indicating that the application processor should wake up, authenticate a fingerprint based on the finger detected during the ultrasonic sensing mode, and if authenticated, turn on the display screen of the touchscreen and unlock the device so that it is in an operational mode for the user. In some implementations where the applications processor of the mobile device is already awake and the mobile device is unlocked, the interrupt signal generated by the two-step capacitive and ultrasonic sensing method may cause the mobile device to return to the home screen and prepare for further user input, should the mobile device not already be in a home-screen mode, or it may cause the mobile device to allow greater access to software, data, information related to an authenticated user, or device capabilities.

A two-step capacitance sensing and ultrasonic sensing may reduce the number of false positives and therefore reduce the current consumption of the device and increase the battery life of the device. Additionally, capacitive sensing often uses lower current than ultrasonic sensing. Thus, first using capacitive sensing before proceeding with ultrasonic sensing may provide further savings regarding battery life and prevent unintentional or inadvertent usage of the mobile device.

FIG. 1 shows a diagrammatic representation of an example mobile device 100 that includes an ultrasonic sensing system according to some implementations. The mobile device 100 may be representative of, for example, various portable computing devices such as cellular phones, smartphones, smart watches, multimedia devices, personal gaming devices, tablet computers and laptop computers, among other types of portable computing devices. However, various implementations described herein are not limited in application to portable computing devices. Indeed, various techniques and principles disclosed herein may be applied in traditionally non-portable devices and systems, such as in computer monitors, television displays, kiosks, vehicle navigation devices and audio systems, among other applications. Additionally, various implementations described herein are not limited in application to devices that include displays.

The mobile device 100 generally includes an enclosure (also referred to as a "housing" or a "case") 102 within which various circuits, sensors and other electrical components reside. In the illustrated example implementation, the mobile device 100 also includes a touchscreen display (also referred to herein as a "touch-sensitive display") 104. The touchscreen display 104 generally includes a display and a touchscreen arranged over or otherwise incorporated into or integrated with the display. The display 104 may generally be representative of any of a variety of suitable display types that employ any of a variety of suitable display technologies. For example, the display 104 may be a digital micro-shutter (DMS)-based display, a light-emitting diode (LED) display, an organic LED (OLED) display, a liquid crystal display (LCD), an LCD display that uses LEDs as backlights, a plasma display, an interferometric modulator (IMOD)-based display, or another type of display suitable for use in conjunction with touch-sensitive user interface (UI) systems.

The mobile device 100 may include various other devices or components for interacting with or otherwise communicating information to or receiving information from a user. For example, the mobile device 100 may include one or more microphones 106, one or more speakers 108, and in some cases one or more at least partially mechanical buttons 110. The mobile device 100 may include various other components enabling additional features such as, for example, one or more video or still-image cameras 112, one or more wireless network interfaces 114 (for example, Bluetooth, WiFi or cellular) and one or more non-wireless interfaces 116 (for example, a universal serial bus (USB) interface or an HDMI interface).

The mobile device 100 may include an ultrasonic sensing system 118 capable of scanning and imaging an object signature, such as a fingerprint, palm print or handprint. In some implementations, the ultrasonic sensing system 118 may function as a touch-sensitive control button. In some implementations, a touch-sensitive control button may be implemented with a mechanical or electrical pressure-sensitive system that is positioned under or otherwise integrated with the ultrasonic sensing system 118. In other words, in some implementations, a region occupied by the ultrasonic sensing system 118 may function both as a user input button to control the mobile device 100 as well as a fingerprint sensor to enable security features such as user authentication features. In some implementations, the ultrasonic sensing system 118 may be positioned under the cover glass of the display or under a portion of the display itself. In some implementations, the ultrasonic sensing system 118 may be positioned on a sidewall or on the backside of the mobile device enclosure 102. The enclosure 102 may house a fingerprint sensor as part of the ultrasonic sensing system 118 that is configurable to operate in either a capacitive sensing mode or an ultrasonic sensing mode.

Figure 2A:
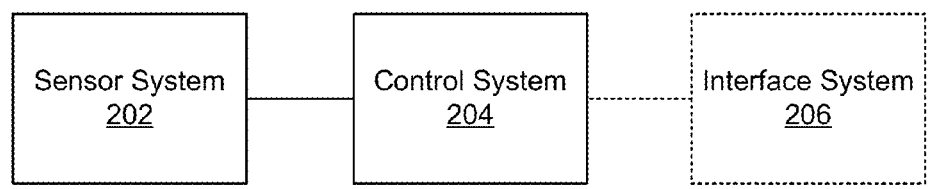
FIG. 2A shows a block diagram representation of components of an example ultrasonic sensing system according to some implementations.

FIG. 2A shows a block diagram representation of components of an example ultrasonic sensing system 200, according to some implementations. As shown, the ultrasonic sensing system 200 may include a sensor system 202 and a control system 204 electrically coupled to the sensor system 202. The sensor system 202 may be capable of scanning an object and providing raw measured image data usable to obtain an object signature such as, for example, a fingerprint of a human finger. The control system 204 may be capable of controlling the sensor system 202 and processing the raw measured image data received from the sensor system. In some implementations, the ultrasonic sensing system 200 may include an interface system 206 capable of transmitting or receiving data, such as raw or processed measured image data, to or from various components within or integrated with the ultrasonic sensing system 200 or, in some implementations, to or from various components, devices or other systems external to the ultrasonic sensing system.

Figure 2B:
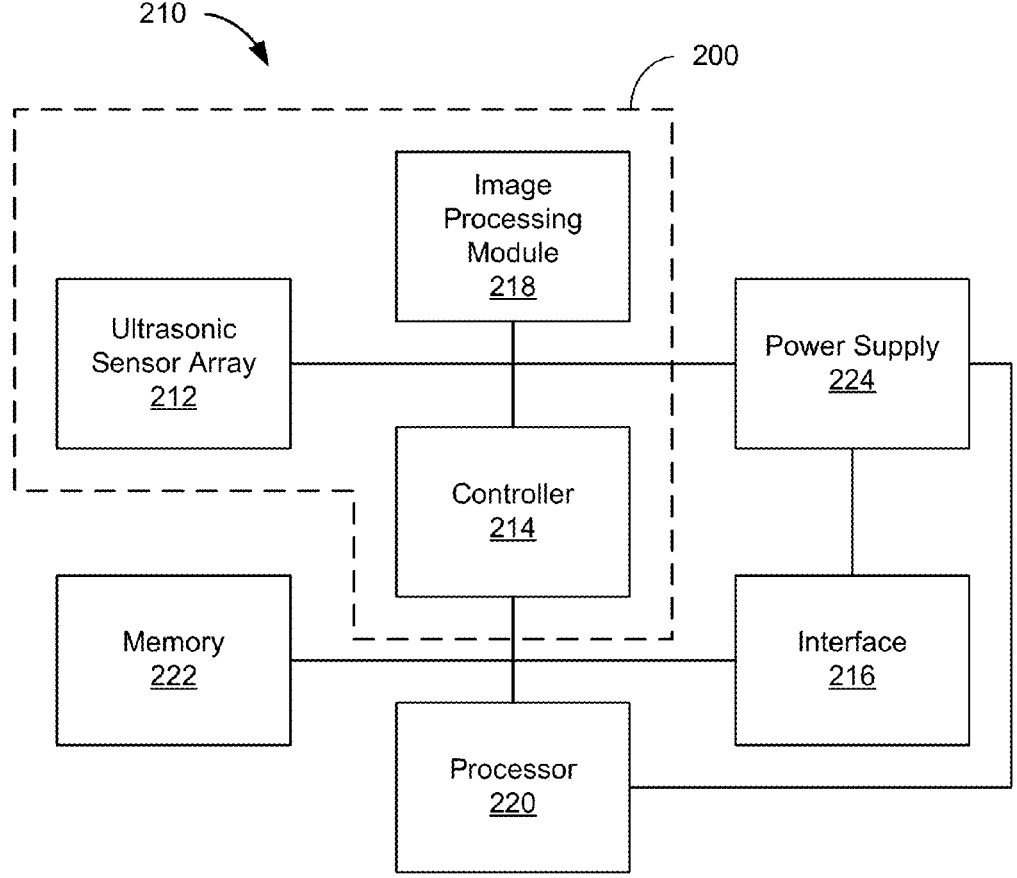
FIG. 2B shows a block diagram representation of components of an example mobile device that includes the ultrasonic sensing system of FIG. 2A.

FIG. 2B shows a block diagram representation of components of an example mobile device 210 that includes the ultrasonic sensing system 200 of FIG. 2A. For example, the mobile device 210 may be a block diagram representation of the mobile device 100 shown in and described with reference to FIG. 1 above. The sensor system 202 of the ultrasonic sensing system 200 of the mobile device 210 may be implemented with an ultrasonic sensor array 212. The control system 204 of the ultrasonic sensing system 200 may be implemented with a controller 214 that is electrically coupled to the ultrasonic sensor array 212. While the controller 214 is shown and described as a single component, in some implementations, the controller 214 may collectively refer to two or more distinct control units or processing units in electrical communication with one another. In some implementations, the controller 214 may include one or more of a general purpose single- or multi-chip processor, a central processing unit (CPU), a digital signal processor (DSP), an applications processor, an application specific integrated circuit (ASIC), a field programmable gate array (FPGA) or other programmable logic device (PLD), discrete gate or transistor logic, discrete hardware components, or any combination thereof designed to perform the functions and operations described herein.

The ultrasonic sensing system 200 of FIG. 2B may include an image processing module 218. In some implementations, raw measured image data provided by the ultrasonic sensor array 212 may be sent, transmitted, communicated or otherwise provided to the image processing module 218. The image processing module 218 may include any suitable combination of hardware, firmware and software configured, adapted or otherwise operable to process the image data provided by the ultrasonic sensor array 212. In some implementations, the image processing module 218 may include signal or image processing circuits or circuit components including, for example, amplifiers (such as instrumentation amplifiers or buffer amplifiers), analog or digital mixers or multipliers, switches, analog-to-digital converters (ADCs), passive filters or active analog filters, among others. In some implementations, one or more of such circuits or circuit components may be integrated within the controller 214, for example, where the controller 214 is implemented as a system-on-chip (SoC) or system-in-package (SIP). In some implementations, one or more of such circuits or circuit components may be integrated within a DSP included within or coupled to the controller 214. In some implementations, the image processing module 218 may be implemented at least partially via software. For example, one or more functions of, or operations performed by, one or more of the circuits or circuit components just described may instead be performed by one or more software modules executing, for example, in a processing unit of the controller 214 (such as in a general-purpose processor or a DSP). In some implementations, the image processing module 218 or portions thereof may be implemented in software that may run on an applications processor such as processor 220 associated with the mobile device 210. The applications processor may have a dedicated coprocessor and/or software modules for secure processing of the biometric image data within the applications processor (sometimes referred to as the "trust zone").

In some implementations, in addition to the ultrasonic sensing system 200, the mobile device 210 may include a separate processor 220, a memory 222, an interface 216 and a power supply 224. In some implementations, the controller 214 of the ultrasonic sensing system 200 may control the ultrasonic sensor array 212 and the image processing module 218, and the processor 220 of the mobile device 210 may control other components of the mobile device 210. In some implementations, the processor 220 communicates data to the controller 214 including, for example, instructions or commands. In some such implementations, the controller 214 may communicate data to the processor 220 including, for example, raw or processed image data (also referred to as "image information"). It should also be understood that, in some other implementations, the functionality of the controller 214 may be implemented entirely, or at least partially, by the processor 220. In some such implementations, a separate controller 214 for the ultrasonic sensing system 200 may not be required because the functions of the controller 214 may be performed by the processor 220 of the mobile device 210.

Depending on the implementation, one or both of controller 214 and processor 220 may store data in the memory 222. For example, the data stored in the memory 222 may include raw measured image data, filtered or otherwise processed image data, estimated image data, or final refined image data. The memory 222 may store processor-executable code or other executable computer-readable instructions capable of execution by one or both of controller 214 and the processor 220 to perform various operations (or to cause other components such as the ultrasonic sensor array 212, the image processing module 218, or other modules to perform operations), including any of the calculations, computations, estimations or other determinations described herein. It should also be understood that the memory 222 may collectively refer to one or more memory devices (or "components"). For example, depending on the implementation, the controller 214 may have access to and store data in a different memory device than the processor 220. In some implementations, one or more of the memory components may be implemented as a NOR- or NAND-based flash memory array. In some other implementations, one or more of the memory components may be implemented as a different type of non-volatile memory. Additionally, in some implementations, one or more of the memory components may include a volatile memory array such as, for example, a type of RAM.

In some implementations, the controller 214 or the processor 220 may communicate data stored in the memory 222 or data received directly from the image processing module 218 through an interface 216. For example, such communicated data can include image data or data derived or otherwise determined from image data. The interface 216 may collectively refer to one or more interfaces of one or more various types. In some implementations, the interface 216 may include a memory interface for receiving data from or storing data to an external memory such as a removable memory device. Additionally or alternatively, the interface 216 may include one or more wireless network interfaces or one or more wired network interfaces enabling the transfer of raw or processed data to, as well as the reception of data from, an external computing device, system or server.

A power supply 224 may provide power to some or all of the components in the mobile device 210. The power supply 224 may include one or more of a variety of energy storage devices. For example, the power supply 224 may include a rechargeable battery, such as a nickel-cadmium battery or a lithium-ion battery. Additionally or alternatively, the power supply 224 may include one or more supercapacitors. In some implementations, the power supply 224 may be chargeable (or "rechargeable") using power accessed from, for example, a wall socket (or "outlet") or a photovoltaic device (or "solar cell" or "solar cell array") integrated with the mobile device 210. Additionally or alternatively, the power supply 224 may be wirelessly chargeable. The power supply 224 may include a power management integrated circuit and a power management system.

As used hereinafter, the term "processing unit" refers to any combination of one or more of a controller of an ultrasonic system (for example, the controller 214), an image processing module (for example, the image processing module 218), or a separate processor of a device that includes the ultrasonic system (for example, the processor 220). In other words, operations that are described below as being performed by or using a processing unit may be performed by one or more of a controller of the ultrasonic system, an image processing module, or a separate processor of a device that includes the ultrasonic sensing system.

Figure 3A:
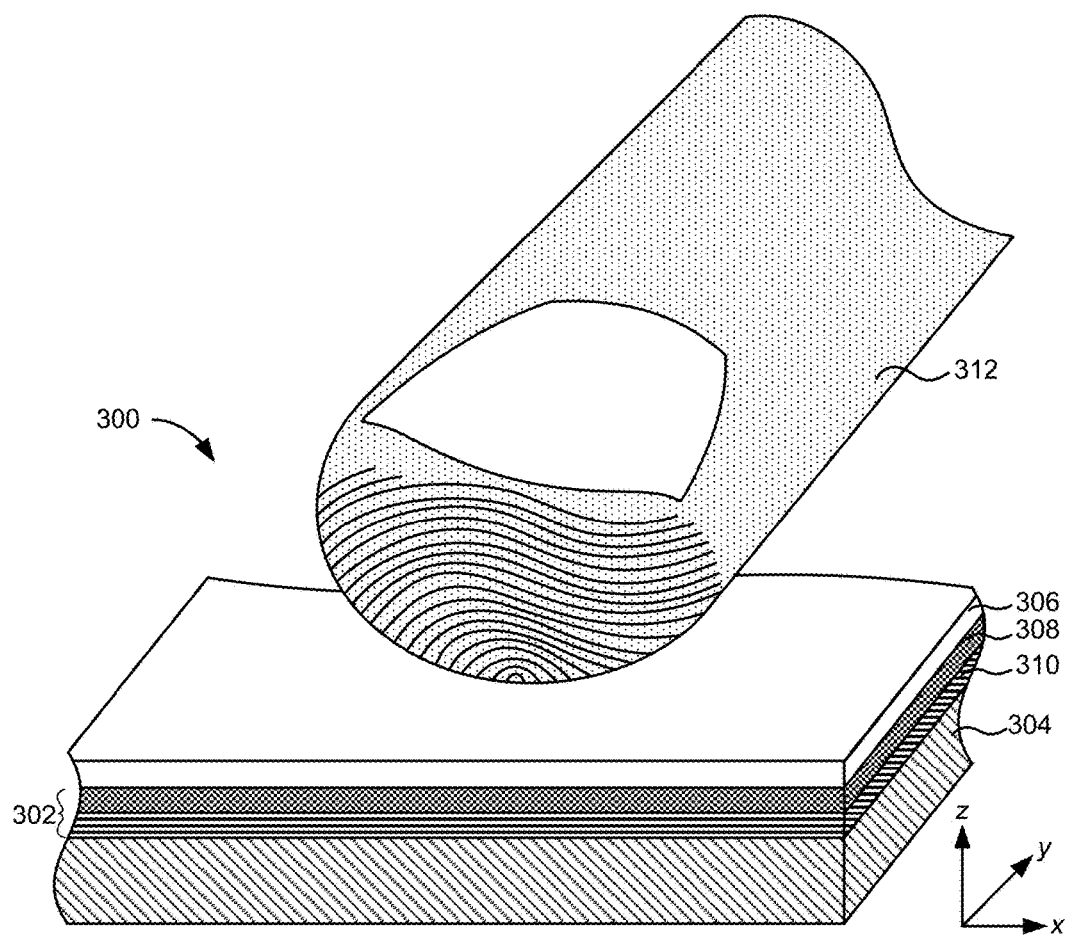
FIG. 3A shows a cross-sectional projection view of a diagrammatic representation of a portion of an example ultrasonic sensing system according to some implementations.
Figure 3B:
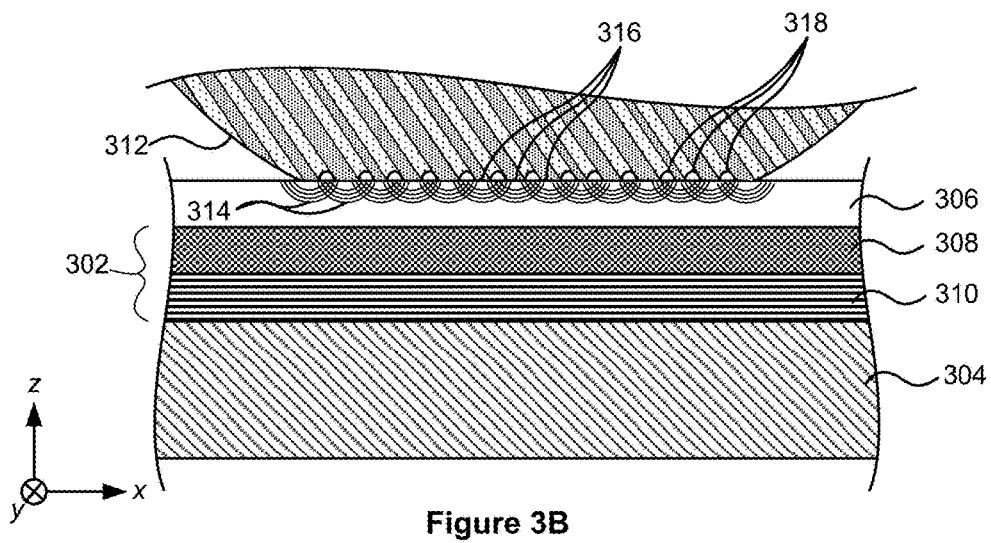
FIG. 3B shows a zoomed-in cross-sectional side view of the example ultrasonic sensing system of FIG. 3A according to some implementations.

FIG. 3A shows a cross-sectional projection view of a diagrammatic representation of a portion of an example ultrasonic sensing system 300 according to some implementations. FIG. 3B shows a zoomed-in cross-sectional side view of the example ultrasonic sensing system 300 of FIG. 3A according to some implementations. For example, the ultrasonic sensing system 300 may implement the ultrasonic sensing system 118 described with reference to FIG. 1 or the ultrasonic sensing system 200 shown and described with reference to FIG. 2A and FIG. 2B. The ultrasonic sensing system 300 may include an ultrasonic transducer 302 that overlies a substrate 304 and that underlies a platen (e.g., a "cover plate" or "cover glass") 306. The ultrasonic transducer 302 may include both an ultrasonic transmitter 308 and an ultrasonic receiver 310.

The ultrasonic transmitter 308 is generally configured to generate and transmit ultrasonic waves towards the platen 306, and in the illustrated implementation, towards a human finger 312 positioned on the upper surface of the platen 306. In some implementations, the ultrasonic transmitter 308 may more specifically be configured to generate and transmit ultrasonic plane waves towards the platen 306. For example, the piezoelectric material of the ultrasonic transmitter 308 may be configured to convert electrical signals provided by the controller of the ultrasonic sensing system into a continuous or pulsed sequence of ultrasonic plane waves at a scanning frequency. In some implementations, the ultrasonic transmitter 308 includes a layer of piezoelectric material such as, for example, polyvinylidene fluoride (PVDF) or a PVDF copolymer such as PVDF-TrFE. In some implementations, other piezoelectric materials may be used in the ultrasonic transmitter 308 and/or the ultrasonic receiver 310, such as aluminum nitride (AlN) or lead zirconate titanate (PZT). In some implementations, the ultrasonic transmitter 308 and/or ultrasonic receiver 310 may additionally or alternatively include capacitive ultrasonic devices such as capacitive micromachined ultrasonic transducers (CMUTs) or piezoelectric ultrasonic devices such as piezoelectric micromachined ultrasonic transducers (PMUTs, also referred to as "piezoelectric micromechanical ultrasonic transducers").

Figure 4A:
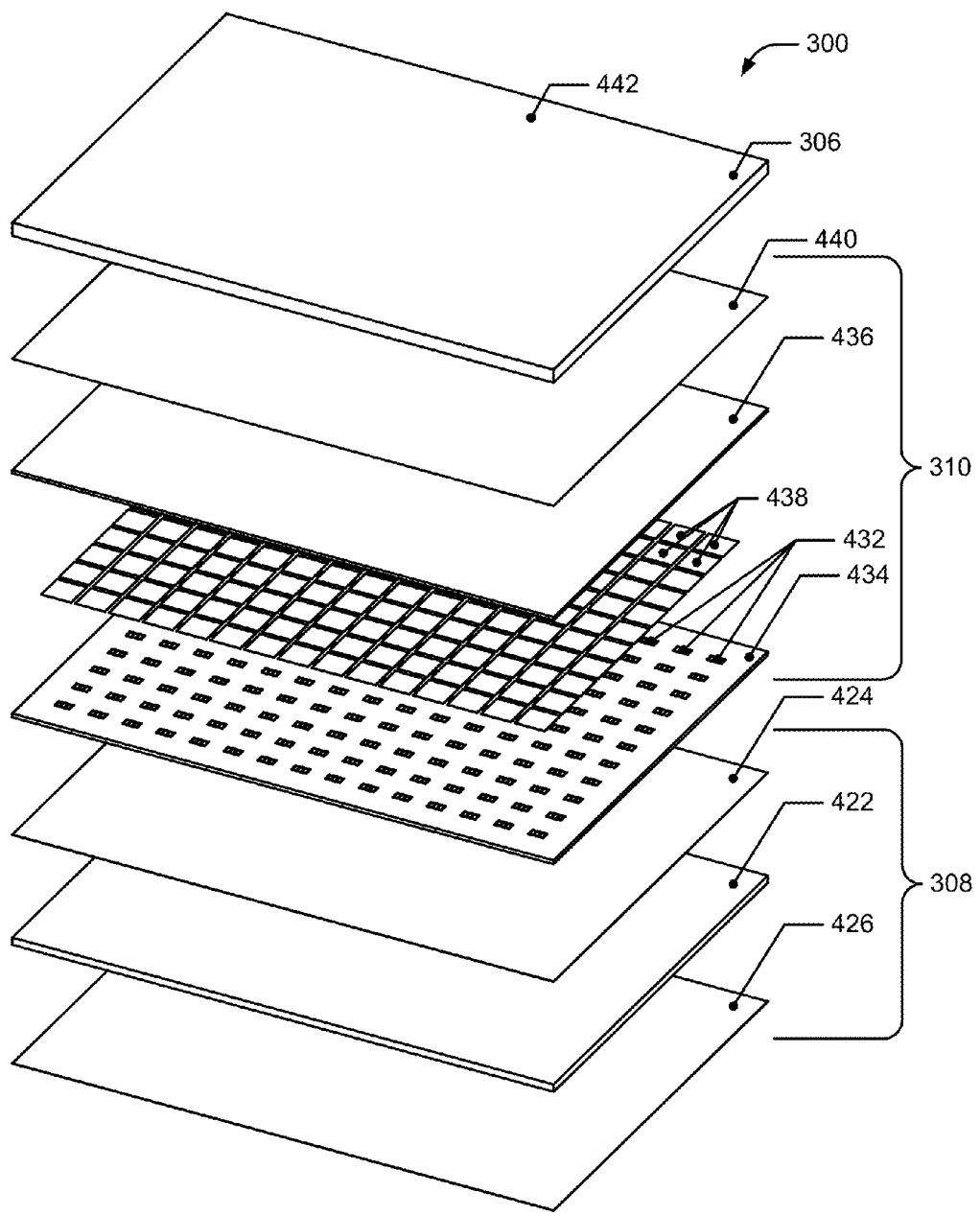
FIG. 4A shows an exploded projection view of example components of the example ultrasonic sensing system of FIGS. 3A and 3B according to some implementations.
Figure 4B:
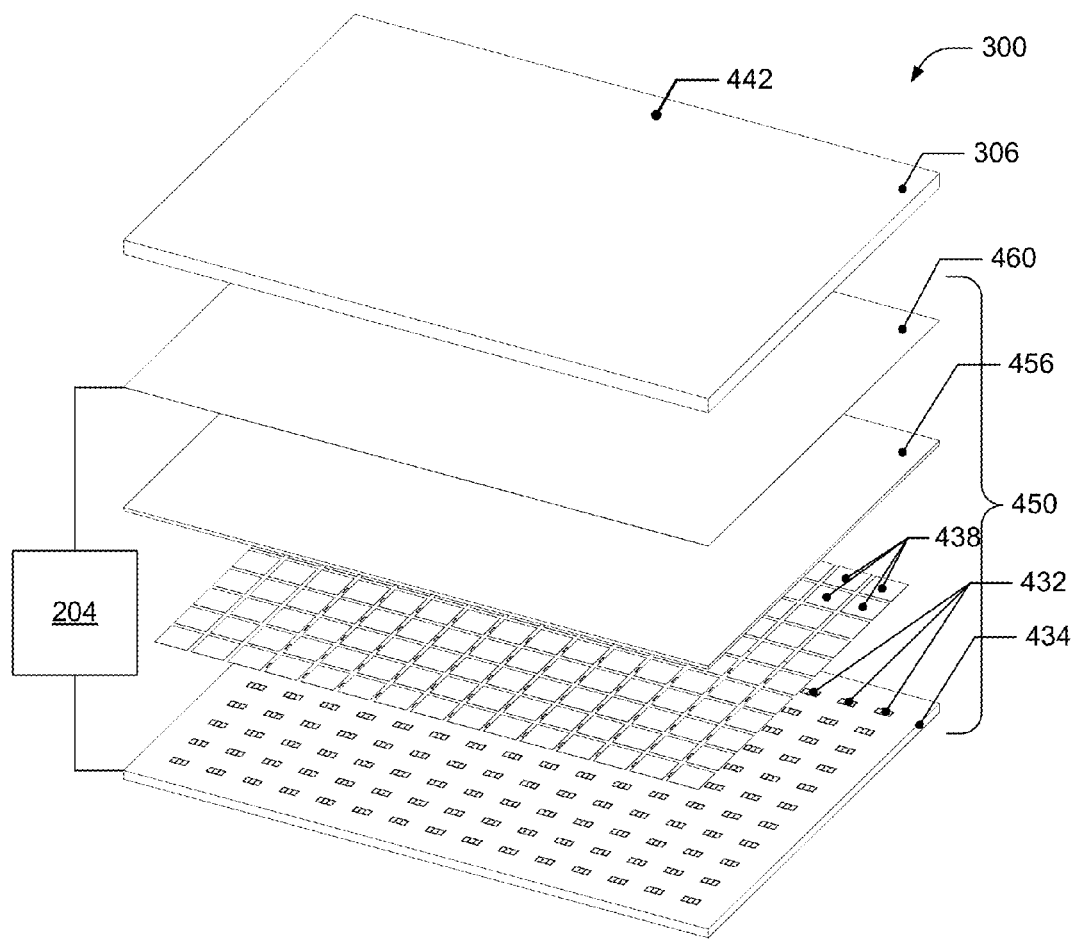
FIG. 4B shows an exploded projection view of example components of an ultrasonic transceiver array in an ultrasonic sensor system of FIGS. 3A and 3B according to some implementations.

The ultrasonic receiver 310 is generally configured to detect ultrasonic reflections 314 resulting from interactions of the ultrasonic waves transmitted by the ultrasonic transmitter 308 with ridges 316 and valleys 318 defining the fingerprint of the finger 312 being scanned. In some implementations, the ultrasonic transmitter 308 overlies the ultrasonic receiver 310 as, for example, illustrated in FIGS. 3A and 3B. In some implementations, the ultrasonic receiver 310 may overlie the ultrasonic transmitter 308 (as shown in FIG. 4A described below). The ultrasonic receiver 310 may be configured to generate and output electrical output signals corresponding to the detected ultrasonic reflections. In some implementations, the ultrasonic receiver 310 may include a second piezoelectric layer different from the piezoelectric layer of the ultrasonic transmitter 308. For example, the piezoelectric material of the ultrasonic receiver 310 may be any suitable piezoelectric material such as, for example, a layer of PVDF or a PVDF-TrFE copolymer. The piezoelectric layer of the ultrasonic receiver 310 may convert vibrations caused by the ultrasonic reflections into electrical output signals. In some implementations, the ultrasonic receiver 310 further includes a thin-film transistor (TFT) layer. In some such implementations, the TFT layer may include an array of sensor pixel circuits configured to amplify or buffer the electrical output signals generated by the piezoelectric layer of the ultrasonic receiver 310. The electrical output signals provided by the array of sensor pixel circuits may then be provided as raw measured image data to the processing unit for use in processing the image data, identifying a fingerprint associated with the image data, and in some applications, authenticating a user associated with the fingerprint. In some implementations, a single piezoelectric layer may serve as the ultrasonic transmitter 308 and the ultrasonic receiver 310 (as shown in FIG. 4B described below). In some implementations, the substrate 304 may be a glass, plastic or silicon substrate upon which electronic circuitry may be fabricated. In some implementations, an array of sensor pixel circuits and associated interface circuitry of the ultrasonic receiver 310 may be configured from CMOS circuitry formed in or on the substrate 304. In some implementations, the substrate 304 may be positioned between the platen 306 and the ultrasonic transmitter 308 and/or the ultrasonic receiver 310. In some implementations, the substrate 304 may serve as the platen 306. One or more protective layers, acoustic matching layers, anti-smudge layers, adhesive layers, decorative layers, conductive layers or other coating layers (not shown) may be included on one or more sides of the substrate 304 and the platen 306.

The platen 306 may be formed of any suitable material that may be acoustically coupled to the ultrasonic transmitter 308. For example, the platen 306 may be formed of one or more of glass, plastic, ceramic, sapphire, metal or metal alloy. In some implementations, the platen 306 may be a cover plate such as, for example, a cover glass or a lens glass of an underlying display. In some implementations, the platen 306 may include one or more polymers, such as one or more types of parylene, and may be substantially thinner. In some implementations, the platen 306 may have a thickness in the range of about 10 microns ($\mu$m) to about 1000 $\mu$m or more.

In some implementations, the ultrasonic sensing system 300 may further include a focusing layer (not shown). For example, the focusing layer may be positioned above the ultrasonic transmitter 308. The focusing layer may generally include one or more acoustic lenses capable of altering the paths of ultrasonic waves transmitted by the ultrasonic transmitter 308. In some implementations, the lenses may be implemented as cylindrical lenses, spherical lenses or zone lenses. In some implementations, some or all of the lenses may be concave lenses, whereas in some other implementations some or all of the lenses may be convex lenses, or include a combination of concave and convex lenses.

In some implementations that include such a focusing layer, the ultrasonic sensing system 300 may additionally include an acoustic matching layer to ensure proper acoustic coupling between the focusing lens(es) and an object, such as a finger, positioned on the platen 306. For example, the acoustic matching layer may include an epoxy doped with particles that change the density of the acoustic matching layer. If the density of the acoustic matching layer is changed, then the acoustic impedance will also change according to the change in density, if the acoustic velocity remains constant. In alternative implementations, the acoustic matching layer may include silicone rubber doped with metal or with ceramic powder. In some implementations, sampling strategies for processing output signals may be implemented that take advantage of ultrasonic reflections being received through a lens of the focusing layer. For example, an ultrasonic wave coming back from a lens' focal point will travel into the lens and may propagate towards multiple receiver elements in a receiver array fulfilling the acoustic reciprocity principle. Depending on the signal strength coming back from the scattered field, an adjustment of the number of active receiver elements is possible. In general, the more receiver elements that are activated to receive the returned ultrasonic waves, the higher the signal-to-noise ratio (SNR). In some implementations, one or more acoustic matching layers may be positioned on one or both sides of the platen 306, with or without a focusing layer.

FIG. 4A shows an exploded projection view of example components of the example ultrasonic sensing system 300 of FIGS. 3A and 3B according to some implementations. The ultrasonic transmitter 308 may include a substantially planar piezoelectric transmitter layer 422 capable of functioning as a plane wave generator. Ultrasonic waves may be generated by applying a voltage across the piezoelectric transmitter layer 422 to expand or contract the layer, depending upon the voltage signal applied, thereby generating a plane wave. In this example, the processing unit (not shown) is capable of causing a transmitter excitation voltage to be applied across the piezoelectric transmitter layer 422 via a first transmitter electrode 424 and a second transmitter electrode 426. The first and second transmitter electrodes 424 and 426 may be metallized electrodes, for example, metal layers that coat opposing sides of the piezoelectric transmitter layer 422. As a result of the piezoelectric effect, the applied transmitter excitation voltage causes changes in the thickness of the piezoelectric transmitter layer 422, and in such a fashion, generates ultrasonic waves at the frequency of the transmitter excitation voltage. In some implementations, first transmitter electrode 424 and/or second transmitter electrode 426 may be used as a capacitive sensing electrode when operating in a capacitive sensing mode and as an ultrasonic sensing electrode when operating in an ultrasonic sensing mode.

The ultrasonic waves may travel towards a target object such as a finger, passing through the platen 306. A portion of the ultrasonic waves not absorbed or transmitted by the target object may be reflected back through the platen 306 and received by the ultrasonic receiver 310, which, in the implementation illustrated in FIG. 4A, overlies the ultrasonic transmitter 308. The ultrasonic receiver 310 may include an array of sensor pixel circuits 432 disposed on a substrate 434 and a piezoelectric receiver layer 436. In some implementations, each sensor pixel circuit 432 may include one or more TFT or silicon-based CMOS transistor elements, electrical interconnect traces and, in some implementations, one or more additional circuit elements such as diodes, capacitors and the like. Each sensor pixel circuit 432 may be configured to convert surface charge generated in the piezoelectric receiver layer 436 proximate to the pixel circuit into an electrical signal. Each sensor pixel circuit 432 may include a pixel input electrode 438 that electrically couples the piezoelectric receiver layer 436 to the sensor pixel circuit 432.

In the illustrated implementation, a receiver bias electrode 440 is disposed on a side of the piezoelectric receiver layer 436 proximal to the platen 306. The receiver bias electrode 440 may be a metallized electrode and may be grounded or biased to control which signals may be passed to the array of sensor pixel circuits 432. For example, when configured to operate in an ultrasonic sensing mode, receiver bias electrode 440 may serve as a sensing electrode. The receiver bias electrode 440 may be driven with a first voltage level corresponding to a block mode during generation of an ultrasonic wave, a second voltage level corresponding to a sample mode when reflected ultrasonic waves are received by the sensor pixel circuits, and a third voltage level corresponding to a hold mode to retain the electrical output signals by the pixel circuitry until the electrical output signals are clocked out of the array of sensor pixel circuits. Ultrasonic energy that is reflected from the exposed (upper/top) surface 442 of the platen 306 may be converted into surface charge by the piezoelectric receiver layer 436. The generated surface charge may be coupled to the pixel input electrodes 438 and underlying sensor pixel circuits 432. The charge signal may be amplified or buffered by the sensor pixel circuits 432 and provided to the processing unit. The processing unit may be electrically connected (directly or indirectly) with the first transmitter electrode 424 and the second transmitter electrode 426, as well as with the receiver bias electrode 440 and the sensor pixel circuits 432 on the substrate 434. In some implementations, the processing unit may operate substantially as described above. For example, the processing unit may be capable of processing the signals received from the sensor pixel circuits 432. In some implementations, receiver bias electrode 440 may be re-configured as a sensing electrode when operating in a capacitive sensing mode and be provided with appropriate drive signals to detect the touch of a finger or other object.

Some examples of suitable piezoelectric materials that can be used to form the piezoelectric transmitter layer 422 or the piezoelectric receiver layer 436 include piezoelectric polymers having appropriate acoustic properties, for example, an acoustic impedance between about 2.5 MRayls and 5 MRayls. Specific examples of piezoelectric materials that may be employed include ferroelectric polymers such as polyvinylidene fluoride (PVDF) and polyvinylidene fluoride-trifluoroethylene (PVDF-TrFE) copolymers. Examples of PVDF copolymers include 60:40 (molar percent) PVDF-TrFE, 70:30 PVDF-TrFE, 80:20 PVDF-TrFE, and 90:10 PVDR-TrFE. Other examples of piezoelectric materials that may be utilized include polyvinylidene chloride (PVDC) homopolymers and copolymers, polytetrafluoroethylene (PTFE) homopolymers and copolymers, and diisopropylammonium bromide (DIPAB). In some implementations, other piezoelectric materials may be used in the piezoelectric transmitter layer 422 and/or the piezoelectric receiver layer 436, such as aluminum nitride (AlN) or lead zirconate titanate (PZT).

The thickness of each of the piezoelectric transmitter layer 422 and the piezoelectric receiver layer 436 is selected so as to be suitable for generating and receiving ultrasonic waves, respectively. In one example, a PVDF piezoelectric transmitter layer 422 is approximately 28 μm thick and a PVDF-TrFE receiver layer 436 is approximately 12 μm thick. Example frequencies of the ultrasonic waves may be in the range of about 1 megahertz (MHz) to about 100 MHz, with wavelengths on the order of a millimeter or less.

As discussed herein, first transmitter electrode 424, second transmitter electrode 426 and receiver bias electrode 440 may be driven (i.e., provided signals) such that ultrasonic sensing system 300 may operate in an ultrasonic sensing mode, as discussed above, as well as in a capacitive sensing mode. That is, the same electrodes of ultrasonic sensor system 202 may be used to implement a fingerprint sensor (e.g., using one or more piezoelectric micromachined ultrasonic transducers) to operate in the capacitive sensing mode and the ultrasonic sensing mode. As previously discussed, using the same fingerprint sensor to implement capacitive sensing and ultrasonic sensing may allow for the reduction in false positives of a finger touching the touchscreen and reduce the drain of the battery of the device.

FIG. 4B shows an exploded projection view of example components of an ultrasonic transceiver array in an ultrasonic sensing system 300 of FIGS. 3A and 3B according to some implementations. In this example, the ultrasonic sensing system 300 includes an ultrasonic transceiver array 450 under a platen 306. The ultrasonic transceiver array 450 may serve as the ultrasonic sensor array 212 that is shown in FIG. 2B and described above. The ultrasonic transceiver array 450 may include a substantially planar piezoelectric transceiver layer 456 capable of functioning as a plane wave generator. Ultrasonic waves may be generated by applying a voltage across the piezoelectric transceiver layer 456. The control system 204 may be capable of generating a transceiver excitation voltage that may be applied across the piezoelectric transceiver layer 456 via one or more underlying pixel input electrodes 438 or one or more overlying transceiver bias electrodes 460. The generated ultrasonic wave may travel towards a finger or other object to be detected, passing through the platen 306. A portion of the wave not absorbed or transmitted by the object may be reflected so as to pass back through the platen 306 and be received by the ultrasonic transceiver array 450. The ultrasonic transceiver array 450 may serve as both an ultrasonic transmitter and an ultrasonic receiver using a single piezoelectric transceiver layer 456.

The ultrasonic, transceiver array 450 may include an array of sensor pixel circuits 432 disposed on a sensor substrate 434. In some implementations, each sensor pixel circuit 432 may include one or more TFT- or silicon-based elements, electrical interconnect traces and, in some implementations, one or more additional circuit elements such as diodes, capacitors and the like. Each sensor pixel circuit 432 may include a pixel input electrode 438 that electrically couples the piezoelectric transceiver layer 456 to the sensor pixel circuit 432.

In the illustrated implementation, the transceiver bias electrode 460 is disposed on a side of the piezoelectric transceiver layer 456 proximal to the platen 306. The transceiver bias electrode 460 may be a metallized electrode and may be grounded or biased to control which signals may be generated and which reflected signals may be passed to the array of sensor pixel circuits 432. Ultrasonic energy that is reflected from the exposed (top) surface 442 of the platen 306 may be converted into surface charge by the piezoelectric transceiver layer 456. The generated surface charge may be coupled to the pixel input electrodes 438 and underlying sensor pixel circuits 432. The charge signal may be amplified or buffered by the sensor pixel circuits 432 and provided to the control system 204.

The control system 204 may be electrically connected (directly or indirectly) to the transceiver bias electrode 460 and the sensor pixel circuits 432 on the sensor substrate 434. In some implementations, the control system 204 may operate substantially as described above. For example, the control system 204 may be capable of processing the amplified or buffered electrical output signals received from the sensor pixel circuits 432.

The control system 204 may be capable of controlling the ultrasonic transceiver array 450 to obtain ultrasonic image data, which may include fingerprint image data. According to some implementations, the control system 204 may be capable of providing functionality such as that described herein, e.g., such as described herein with reference to FIGS. 1-3B and FIGS. 5-20.

In other examples of an ultrasonic sensor system with an ultrasonic transceiver array, a backside of the sensor substrate 434 may be attached directly or indirectly to an overlying platen 306. In operation, ultrasonic waves generated by the piezoelectric transceiver layer 456 may travel through the sensor substrate 434 and the platen 306, reflect off surface 442 of the platen 306, and travel back through the platen 306 and the sensor substrate 434 before being detected by sensor pixel circuits 432 on or in the substrate sensor 434.

Figure 5:
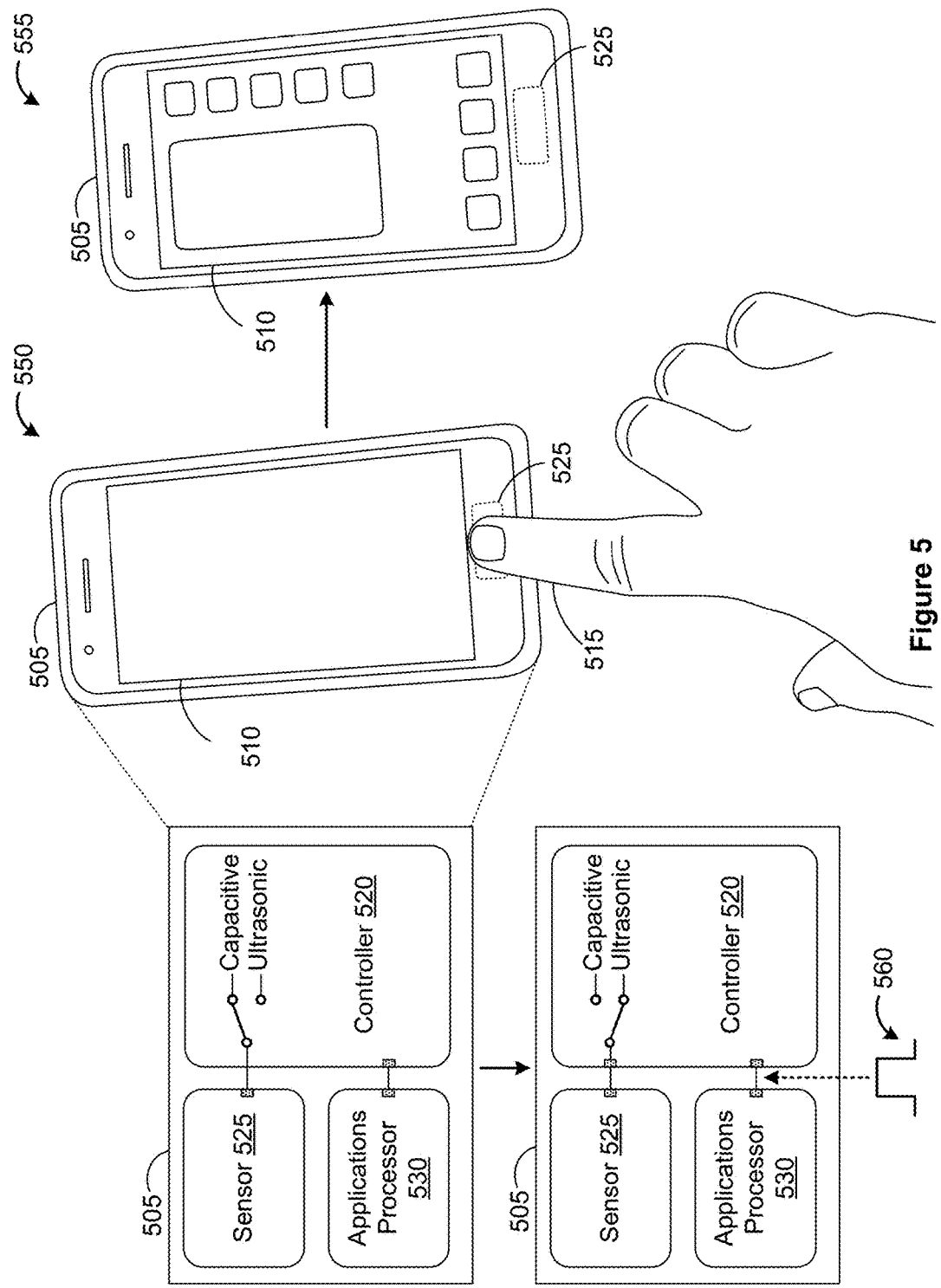
FIG. 5 shows an example of using a fingerprint sensor in capacitive sensing and ultrasonic sensing modes to "wake up" an electronic device.
Figure 6:
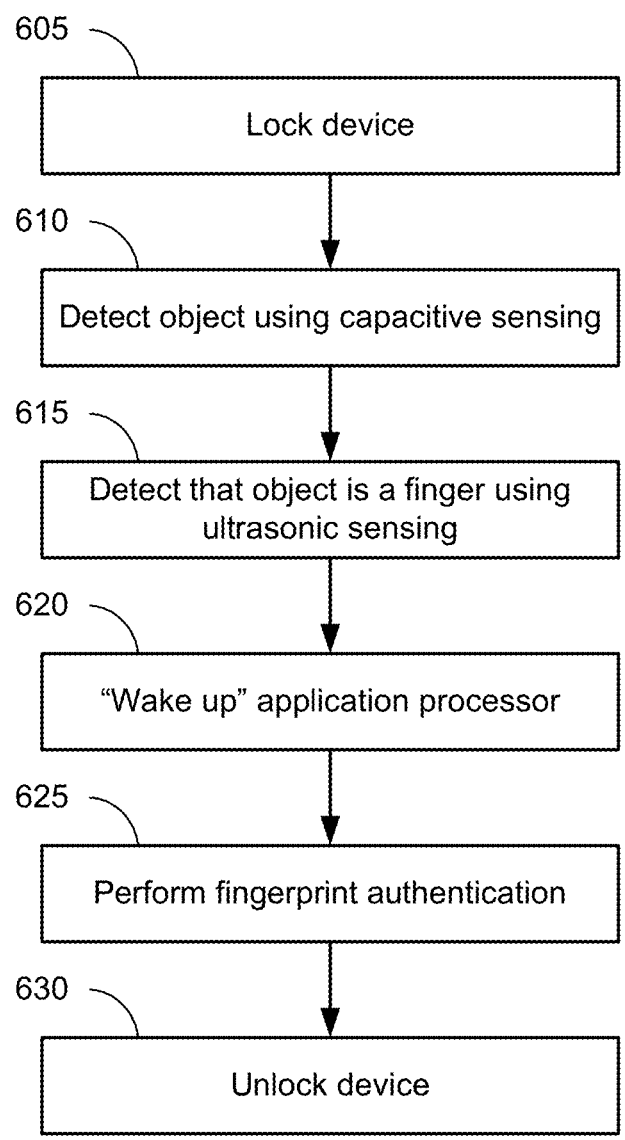
FIG. 6 shows an example of a flowchart for using the fingerprint sensor in capacitive sensing and ultrasonic sensing modes to wake up the electronic device.

In more detail, FIG. 5 shows an example of using a fingerprint sensor in capacitive sensing and ultrasonic sensing modes to "wake up" an electronic device. In FIG. 5, electronic device 505 (e.g., mobile device 210) includes controller circuit 520 (e.g., controller 214 in FIG. 2B) which may switch sensor 525 (e.g., at least one of the ultrasonic sensors of ultrasonic sensor array 212 of ultrasonic sensor system 202 in FIG. 2B) to operate between a capacitive sensing mode and an ultrasonic sensing mode. FIG. 6 shows an example of a flowchart for using the fingerprint sensor in capacitive sensing and ultrasonic sensing modes to wake up the electronic device. In FIG. 6, at block 605, an electronic device may be in a "locked" state in which an applications processor and display of the electronic device are turned off or are in a low-power sleep mode. For example, in FIG. 5, at time 550, electronic device 505 is in the locked state. This results in display 510 (i.e., a display of a touchscreen of electronic device 505) being turned off (i.e., no visual image content is being displayed) and applications processor 530 (e.g., processor 220 in FIG. 2B) may be turned off or in a relatively low-power "sleep" mode.

Next, at block 610, an object may be detected using capacitive sensing. For example, in FIG. 5, at time 550, finger 515 is placed above sensor 525 that is part of an ultrasonic authenticating button (e.g., "home button") of electronic device 505. In some implementations, the sensor 525 may be part of an electromechanical button that can validate or otherwise authenticate a user and is inserted through a cutout region in the cover glass of the display 510. In some implementations (such as illustrated in FIG. 5), the sensor 525 may be positioned behind the cover glass of the display 510 without requiring cutouts in the cover glass. In the simplified example of FIG. 5, controller circuit 520 has also configured sensor 525 to operate in a capacitive sensing mode, as depicted with the state of the switch in the electronic device 505. This results in sensor 525 being used to implement a capacitive sensing system, and therefore, an object positioned near or on the display 510, sensor 525, or other sensing electrode formed on or under the cover glass of the electronic device 505 may be detected. For example, the capacitance of the object on the button or display may be modeled as part of a capacitive voltage divider with one of the electrodes of sensor 525 and a voltage corresponding to the capacitance can be "read out" by a corresponding sensor circuit, as previously discussed. In some implementations, one or more electrodes of a touchscreen such as a projected capacitive touch (PCT) touchscreen may serve as a sensing electrode when operating in the capacitive sensing mode. Touching a sensing electrode, as used throughout this disclosure, refers to physically touching the sensing electrode with an object such as a finger and/or physically coming into contact or touching any dielectric layers, coatings, platens, other layers or other materials that may be positioned between the sensing electrode and the finger through which the finger may be detected. Touching a sensing electrode may refer to an object such as a finger that is positioned on or near the sensing electrode to allow detection of the object using either the capacitive sensing mode or the ultrasonic sensing mode.

If an object is determined to have been positioned near or on the display 510, sensor 525 or other sensing electrode (e.g., based on the read-out voltage), then at block 615, whether the object is a finger or is likely to be a finger may then be determined using ultrasonic sensing. For example, in FIG. 5, controller circuit 520 may configure sensor 525 to operate in an ultrasonic sensing mode, as depicted in the change of the state of the switch in the electronic device 505. This results in sensor 525 transmitting and receiving ultrasonic waves, as discussed previously, to generate and provide fingerprint image data corresponding with a full or partial fingerprint image of finger 515. The full array of piezoelectric sensor pixels or a smaller collection of sensor pixels of sensor 525 may be used.

If controller circuit 520 determines that the object is determined to be a finger (e.g., recognize based on the data that finger 515 has ridges and valleys or other characteristics of a fingerprint belonging to a finger such as an acoustic impedance that falls within a range of a finger), then at block 620, controller circuit 520 may "wake up" an applications processor. For example, in FIG. 5, applications processor 530 may be activated (or triggered, initialized, etc.) from a sleep mode or off state by controller circuit 520 asserting (e.g., transitioning a logic level from a first level to a second, different level, such as low voltage to high voltage) interrupt signal 560 upon the determination that an object (e.g., finger 515) touching at least one of the sensing electrodes is indeed a finger using sensor 525 in the ultrasonic sensing mode. The asserted interrupt signal may represent that the object is determined to be a finger and serve to instruct the applications processor to authenticate the fingerprint. In some implementations, controller circuit 520 or applications processor 530 may also turn on display 510.

Next, at block 625, fingerprint authentication may be performed. For example, applications processor 530 may obtain the fingerprint image data (e.g., by receiving the corresponding data stored in memory by controller circuit 520) and then determine whether the fingerprint image data represents a fingerprint of an authorized user of the electronic device 505 by using, for example, a matching and authentication process. If so, then at block 630, the device may be unlocked or in some implementations unlock the display 510 and return to a home screen. For example, in FIG. 5, at time 555, display 510 is turned on and the electronic device 505 has been unlocked (e.g., most or the full operating functionality and software of electronic device 505 is now available for use). The image data for the authorized fingerprint may have been provided previously by the user (e.g., the owner), for example, during the setup of electronic device 505 or during enrollment and setup of the security features of the electronic device.

Figure 7A:
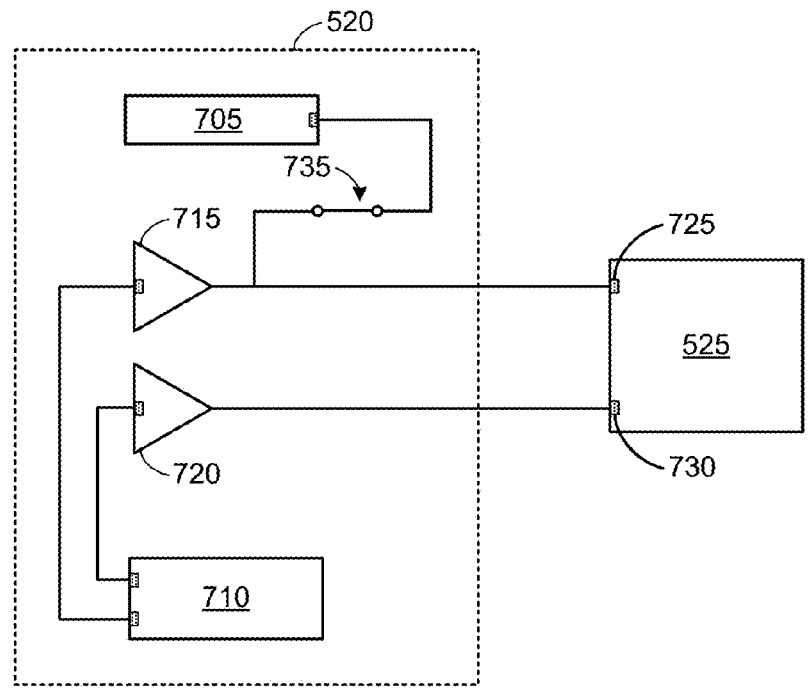
FIG. 7A shows an example of a circuit schematic of a controller circuit configuring a fingerprint sensor to operate in a capacitive sensing mode.

In more detail, sensor 525 may switch from operating in a capacitive sensing mode to an ultrasonic sensing mode (or ultrasonic sensing mode to capacitive sensing mode) based on how the electrodes are driven. FIG. 7A shows an example of a circuit schematic of a controller circuit configuring a fingerprint sensor to operate in a capacitive sensing mode. In FIG. 7A, controller circuit 520 includes capacitive touch module 705 used to provide a signal to receiver bias electrode 725 (e.g., receiver bias electrode 440 or transceiver bias electrode 460) of sensor 525 if switch 735 (e.g., implemented by an n-type or p-type metal-oxide-semiconductor field-effect transistor (MOSFET), a thin-film transistor (TFT), etc.) is turned on (i.e., the switch is in a closed position as depicted in FIG. 7A such that the output of capacitive touch module 705 may drive receiver bias electrode 725).

In some implementations, the drive signal generated by the capacitive touch module 705 may include a frequency-hopping signal having two or more frequencies that are applied in a predetermined sequence. For example, a sequence of three or five different frequencies may be generated by the capacitive touch module 705 and applied to the sensing electrode when operating in the capacitive sensing mode. In some implementations, the drive signal generated by the capacitive touch module 705 may include a pre-charging phase and a charge-sharing phase of a conversion sequence, where a reference voltage is applied to an internal reference capacitor and an analog-to-digital converter (ADC) to zero the ADC output in the pre-charging phase, and where the charge on the reference capacitor is shared via a sensing electrode with the capacitance of a finger and any parasitic capacitances such as the PVDF capacitance in the charge-sharing phase. The output from the ADC in the charge-sharing phase provides a measure of the finger capacitance and whether a finger is present by comparing the ADC output to a touch detection threshold value. Consecutive measurements using the conversion sequence with each measurement allows a determination to be made of any changes in the detected capacitance, such as a finger touch or a finger lift. Additionally, amplifier 715 of controller circuit 520 may have its output disconnected (e.g., be in a high-impedance state, floating, undriven, tri-stated, etc.

such that amplifier 715 is not driving its output) such that capacitive touch module 705 may drive receiver bias electrode 725 without any contention. In some implementations, both amplifiers 715 and 720 may be turned off (i.e., powered off) to reduce power consumption because they are not needed for sensor 525 to operate in a capacitive sensing mode. By driving receiver bias electrode 725, a capacitive voltage divider may be modeled with a voltage corresponding to the capacitance of the object on the touchscreen being determined. The depictions of amplifiers 715 and 720 are simplified. For example, they may include additional grounded input terminals. The drive signals and techniques for operation in a capacitive sensing mode may be applied to one or more sensing electrodes configured in a mobile device. The controller circuit 520 may be configured to provide (e.g., generate, switch and apply) the drive signals to one or more sensing electrodes to operate in the capacitive sensing mode.

In operation, a finger of a user may contact or be positioned sufficiently near the receiver bias electrode 725 of the sensor 525 and the additional capacitance due to the finger may be detected by the capacitive touch module 705. Detection of a finger in contact with or near the receiver bias electrode 725 may allow the controller circuit 520 to generate a touch-detected signal that may in turn be used to wake up a mobile device, trigger additional sequences to authenticate the finger, or initiate another function such as a home-button function.

Figure 7B:
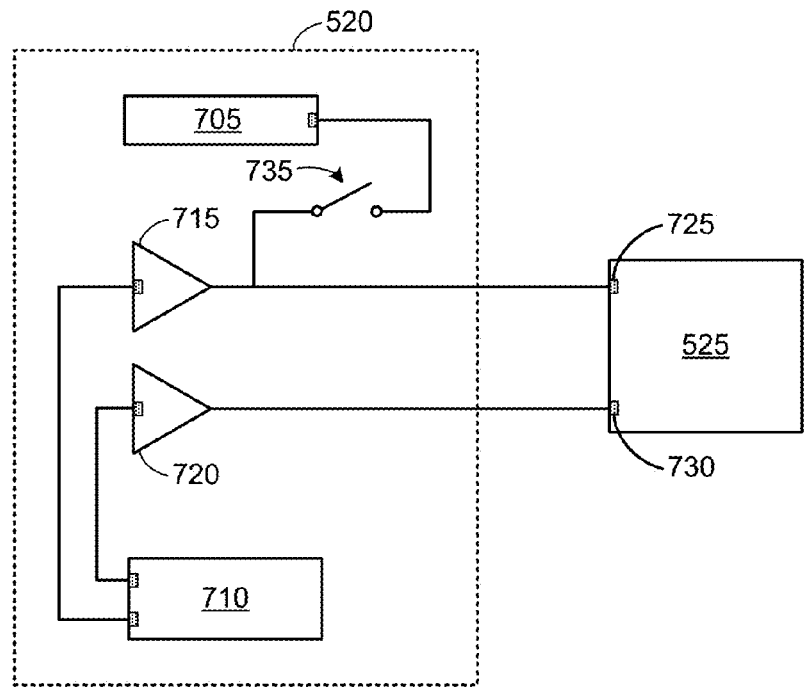
FIG. 7B shows an example of a circuit schematic of a controller circuit configuring a fingerprint sensor to operate in an ultrasonic sensing mode.

By contrast, FIG. 7B shows an example of a circuit schematic of a controller circuit 520 configuring a fingerprint sensor 525 to operate in an ultrasonic sensing mode. In FIG. 7B, control circuitry 710 may drive amplifiers 715 and 720 and configure switch 735 to be off (i.e., the switch is in an opened position as depicted in FIG. 7B such that capacitive touch module 705 does not drive receiver bias electrode 725). This results in receiver bias electrode 725 of sensor 525 driven by amplifier 715 and diode bias electrode 730 (e.g., a control signal for controlling sensor pixel circuits 432) driven by amplifier 720. Receiver bias electrode 725 may be driven to a much higher voltage using amplifier 715. For example, to operate sensor 525 in a capacitive sensing mode, receiver bias electrode 725 might be provided a 1.8 volt (V) signal by capacitive touch module 705. By contrast, to operate sensor 525 in an ultrasonic sensing mode, receiver bias electrode 725 might be provided a 4-17 V signal by amplifier 715. Additionally, diode bias electrode 730 may be driven in accordance with the ultrasonic sensing mode of operation. For example, the diode bias electrode may be driven with a first voltage level corresponding to a block mode during generation of an ultrasonic wave, a second voltage level corresponding to a sample mode when reflected ultrasonic waves are received by the sensor pixel circuits, and a third voltage level corresponding to a hold mode to retain the electrical output signals by the pixel circuitry until the electrical output signals are clocked out of the array of sensor pixel circuits.

Figure 8:
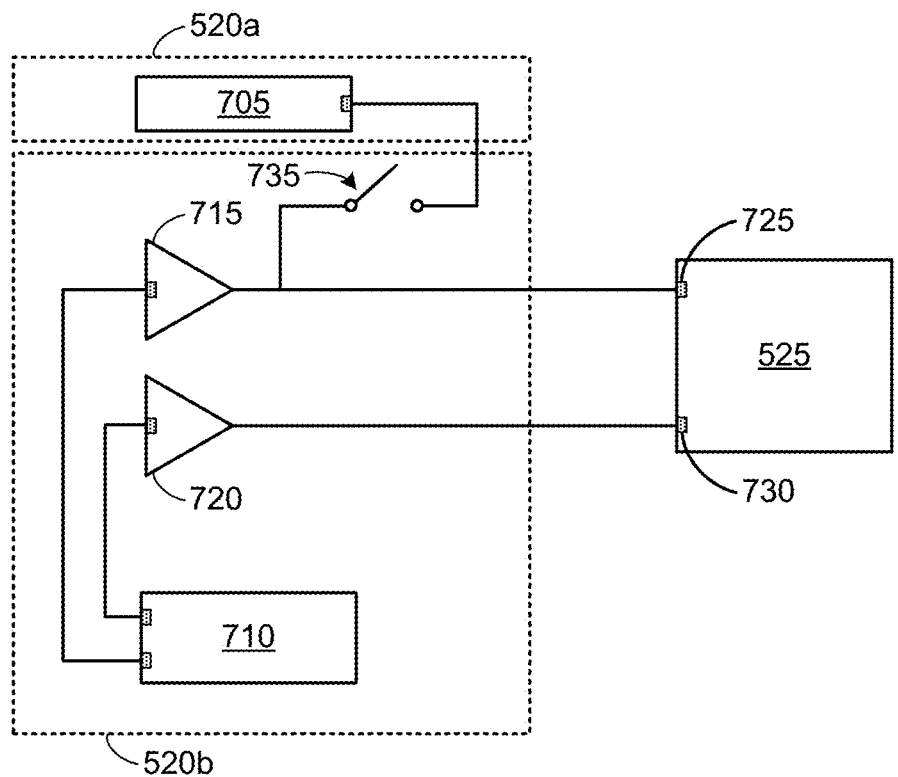
FIG. 8 shows an example of a circuit schematic of a controller circuit for configuring a fingerprint sensor to operate in capacitive or ultrasonic sensing modes.

Sensor 525 may be configured in a variety of other ways to operate in either capacitive or ultrasonic sensing modes. FIG. 8 shows another example of a circuit schematic of a controller circuit for configuring a fingerprint sensor to operate in capacitive or ultrasonic sensing modes. In FIG. 8, the circuitry for controller circuit 520 may be included within separate chips, for example, controller circuit 520a may include an external capacitance touch module 705 while controller circuit 520b includes switch 735, amplifiers 715 and 720, and control circuitry 710. For example, to configure sensor 525 in a capacitive sensing mode in FIG. 8, switch 735 may be turned on such that capacitance touch module 705 drives receiver bias electrode 725 and the output of amplifier 715 is set to a high-impedance state. Diode bias electrode 730 may be grounded (e.g., driven by amplifier 720 so that it provides a voltage corresponding to ground). To configure sensor 525 in an ultrasonic sensing mode, switch 735 may be opened such that receiver bias electrode 725 is no longer driven by capacitance touch module 705. Rather, amplifiers 715 and 720 may provide drive signals to receiver bias electrode 725 and diode bias electrode 730, respectively, when configured to operate in the ultrasonic sensing mode. In various implementations such as those shown in FIGS. 7A, 7B and 8, the switch 735 may be physically located in the external capacitance touch module 705, in a controller ASIC associated with the controller circuit 520, within the sensor 525, or as a component external to the touch module 705 and controller ASIC.

The examples of FIGS. 7A, 7B and 8 use the receiver bias electrode 725 for both capacitive and ultrasonic sensing. That is, receiver bias electrode 725 may be used to detect the capacitance of an object resting on or near the receiver bias electrode and for ultrasonic sensing to determine that the object is a finger by driving the receiver bias electrode 725 and associated circuitry in sensor 525 differently.

Figure 9:
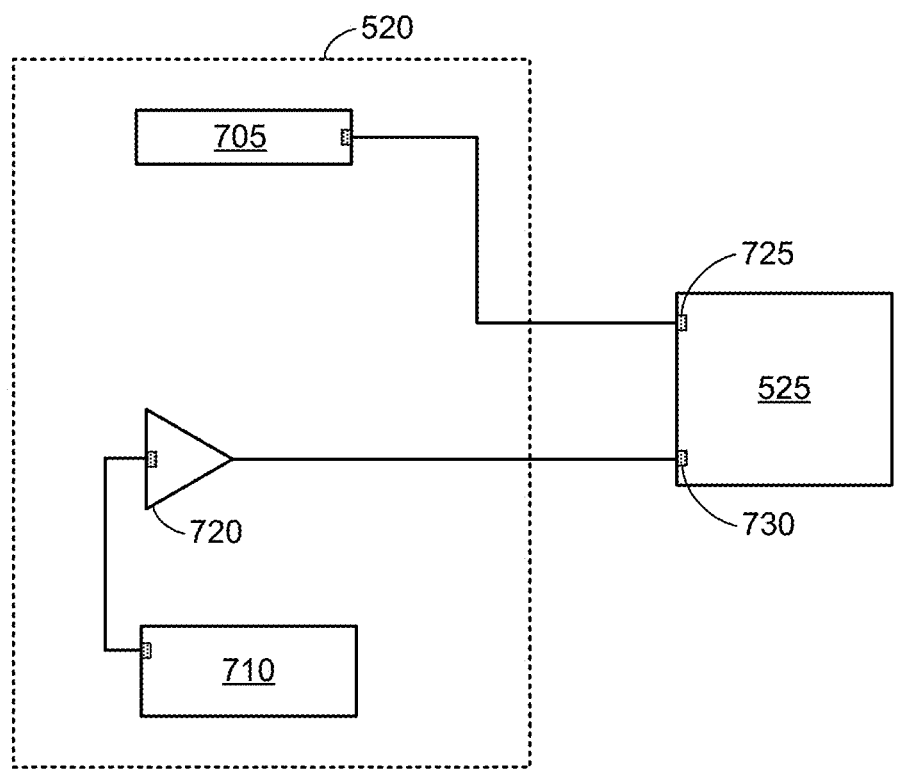
FIG. 9 shows another example of a circuit schematic of a controller circuit for configuring a fingerprint sensor to operate in capacitive or ultrasonic sensing modes.

However, separate electrodes may be used for capacitive sensing and ultrasonic sensing. For example, receiver bias electrode 725 may be used for capacitive sensing and both receiver bias electrode 725 and diode bias electrode 730 may be used for ultrasonic sensing. FIG. 9 shows another example of a circuit schematic of a controller circuit for configuring a fingerprint sensor to operate in capacitive sensing and ultrasonic sensing modes. In FIG. 9, receiver bias electrode 725 may be driven by capacitive touch module 705 and diode bias electrode 730 may be grounded or set at another fixed potential to operate sensor 525 in a capacitive sensing mode. By contrast, in the ultrasonic sensing mode, receiver bias electrode 725 may be grounded and amplifier 720 may be driven to provide an active signal to diode bias electrode 730 to enable ultrasonic sensing. In this implementation, amplifier 715 and switch 735 may be removed or operated in a high-impedance state in relation to the examples of FIGS. 7A and 7B.

Figure 10:
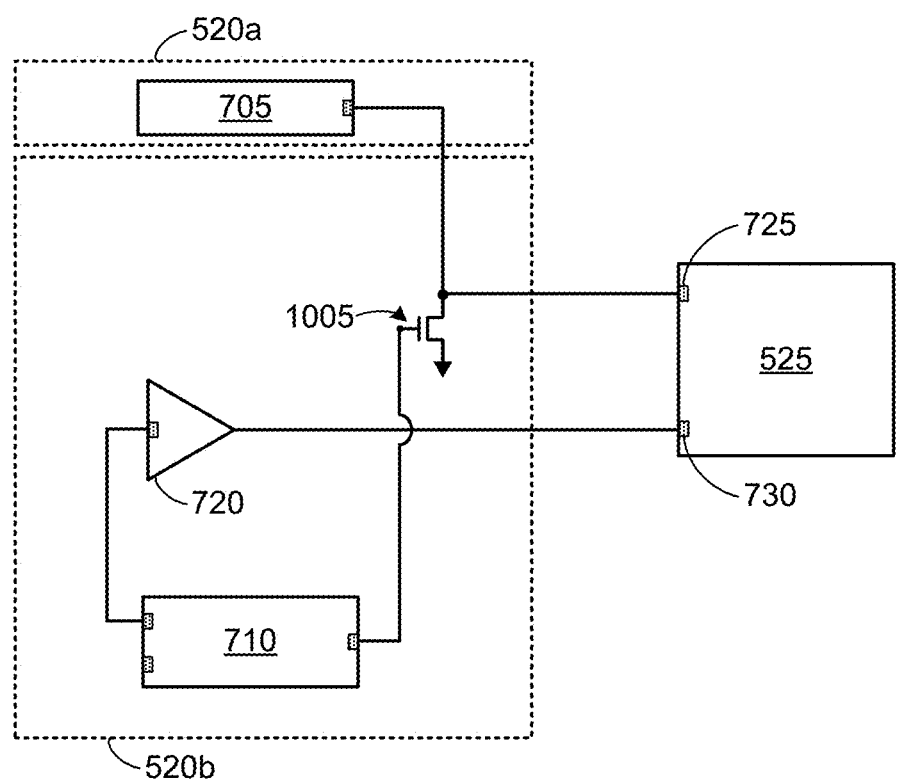
FIG. 10 shows another example of a circuit schematic of a controller circuit for configuring a fingerprint sensor to operate in capacitive or ultrasonic sensing modes.

FIG. 10 shows another example of a circuit schematic of a controller circuit for configuring a fingerprint sensor to operate in capacitive or ultrasonic sensing modes. In FIG. 10, receiver bias electrode 725 may be driven by capacitance touch module 705 and diode bias electrode 730 may be grounded (e.g., control circuitry 710 can drive amplifier 720 such that a voltage corresponding to ground (e.g., 0 V in some scenarios) is applied to diode bias electrode 730) to configure sensor 525 in a capacitive sensing mode. By contrast, to configure sensor 525 in an ultrasonic sensing mode, control circuitry 710 may ground receiver bias electrode 725 by turning on switch 1005 (e.g., an n-type or p-type MOSFET) and providing an active signal to diode bias electrode 730 using amplifier 720 to operate sensor 525 in the ultrasonic sensing mode.

As previously discussed, sensor 525 may be configured to be in a capacitive sensing mode to determine whether an object has touched or is positioned near the receiver bias electrode of the ultrasonic sensor, and then subsequently configured to be in an ultrasonic sensing mode to determine whether that object is a finger. If the object is determined to be a finger, then a flag may be asserted to indicate that an applications processor should wake up and authenticate a fingerprint of the finger (e.g., determine whether it matches or is similar to a fingerprint of the owner or registered user of the device). If authenticated, then the applications processor may turn on the display of the touchscreen and unlock the device for normal use.

Figure 11:
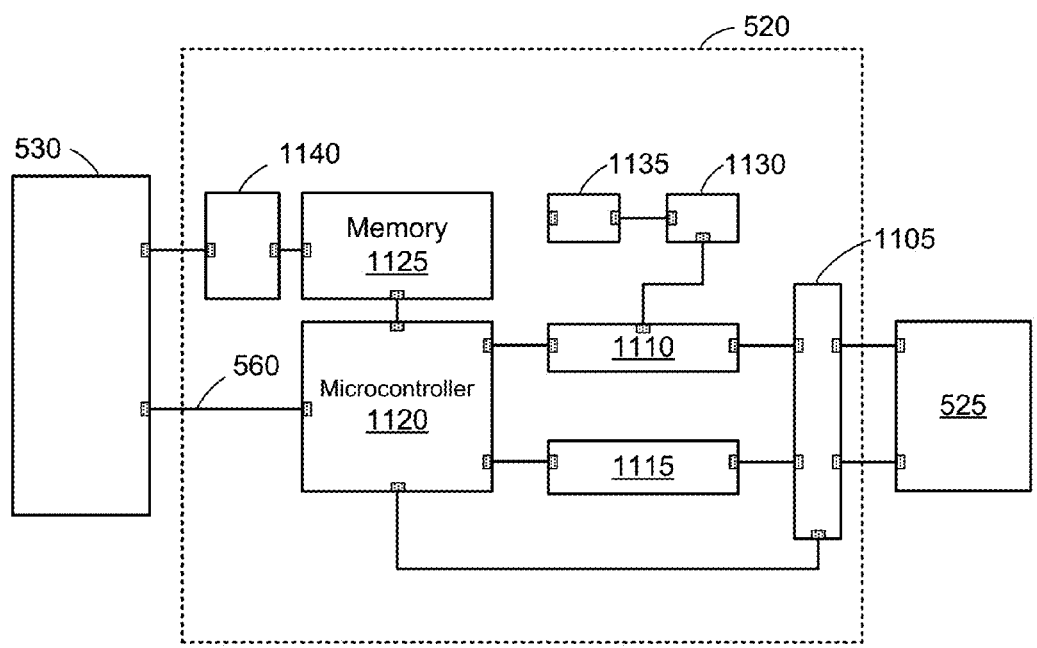
FIG. 11 shows an example of a high-level block diagram of a controller circuit, fingerprint sensor and an applications processor.

FIG. 11 shows an example of a high-level block diagram of a controller circuit, fingerprint sensor and applications processor. In FIG. 11, capacitive touch analog front end 1110 and ultrasonic analog front end 1115 include circuitry used to drive the electrodes of sensor 525. Interface circuit 1105 (e.g., including control circuitry 710, switch 1005, etc. in the prior figures) selects the front-end circuitry used to drive those electrodes. Microcontroller 1120 may determine whether sensor 525 detects the presence of an object on or near the fingerprint sensor 525 in the capacitive sensing mode and determine whether interface circuit 1105 should switch sensor 525 to operate in the ultrasonic sensing mode to determine whether the object is a finger. Information regarding the results of the capacitive sensing mode and the ultrasonic sensing mode can be stored in memory 1125. For example, microcontroller 1120 may store data representing the capacitance measurement information from sensor 525 in the capacitive sensing mode and the image data from sensor 525 in the ultrasonic sensing mode. In some implementations, data representing the measurement conditions such as temperature, whether a touch is a "strong" touch or a "weak touch" (e.g., the likelihood of a touch), and other metrics may also be stored. Clock generator 1135 may be a low-power clock generator for wakeup timer 1130 that is used to operate capacitive touch analog front end 1110.

If the object is a finger, an interrupt signal 560 may be asserted and provided to applications processor 530. As a result, applications processor 530 may read the data stored in memory 1125, for example, via an I²C serial bus slave interface 1140. This restricts applications processor 530 to having access to memory 1125 and not microcontroller 1120, and therefore, increasing the security of controller circuit 520 (e.g., by preventing access to the embedded memory of microcontroller 1120). If the data corresponds to a fingerprint that matches or is sufficiently similar to an authorized fingerprint, then applications processor 530 may unlock the electronic device (e.g., a mobile device) and/or turn on the display of the touchscreen. For example, authorized fingerprint data may be stored in memory and accessible by applications processor 530. In some implementations, one or more portions of applications processor 530 may wake up when an interrupt signal 560 is received and the applications processor 530 may be instructed to authenticate the fingerprint of a finger. An inquiry template generated during an authentication process from ultrasonic fingerprint image data received from sensor 525 may be compared to one or more enrolled templates generated during an enrollment process using one or more matching algorithms to determine whether the fingerprint should be authenticated.

In some implementations, microcontroller 1120 may authenticate the fingerprint based on the data generated from sensor 525. If the fingerprint is authenticated, then microcontroller 1120 may assert interrupt signal 560 to instruct applications processor 530 to unlock the electronic device. When the fingerprint has been authenticated, a display of the mobile device and/or the mobile device may be unlocked. In some implementations when the mobile device and display are already woken up and unlocked from an earlier authentication process, the mobile device may return to a home screen when a finger is placed, for example, on a home button or other designated sensing electrode.

Figure 12:
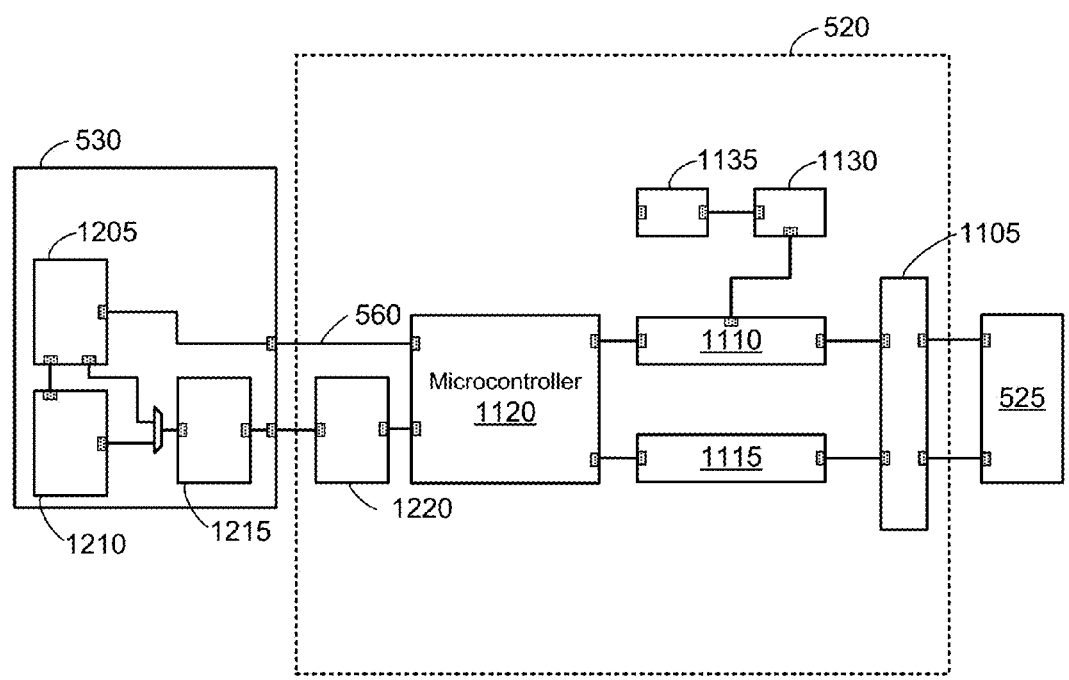
FIG. 12 shows another example of a high-level block diagram of a controller circuit, fingerprint sensor and applications processor.

FIG. 12 shows another example of a high-level block diagram of a controller circuit, fingerprint sensor and applications processor. In FIG. 12, applications processor 530 includes a high-level operating system (HLOS) 1205, trust zone 1210 and SPI master 1215. Controller circuit 520 may include SPI slave 1220. Applications processor 530 may access the data stored by microcontroller 1120 via a serial peripheral interface (SPI) bus implemented by SPI master 1215 and SPI slave 1220. For example, the SPI bus may operate in a secure fingerprinting mode and a capacitive touch mode. In the secure fingerprinting mode, trust zone 1210 of applications processor 530 may "own" the SPI bus and have access to all of controller circuit 520 (e.g., all of the address space, including the data generated and stored from the capacitive sensing mode and the ultrasonic sensing mode). In the capacitive touch mode, HLOS 1205 may "own" the SPI bus and applications processor 530 may have access restricted to the memory and registers that are storing data from sensor 525 being in the capacitive sensing mode.

The two-step capacitance sensing and ultrasonic sensing described above may reduce the number of false positives of an object touching the touchscreen being a finger with an authenticatable fingerprint, and therefore, reduce the current consumption of the device and increase the battery life of the device. For example, in some scenarios, the two-step, or hybrid, capacitance sensing and ultrasonic sensing may reduce the current consumption of the electronic device from about 200 microamps (µA) if only ultrasonic sensing is used for unlocking the electronic device to under 40 µA. Moreover, the two-step techniques described herein may reduce the number of false wakeups of applications processor 530 and display of the touchscreen. For example, some electronic devices may experience many non-finger touches when the device is locked and may inadvertently unlock or perform more intensive operations to verify or otherwise authenticate the touch.

As previously discussed, sensor 525 may include material such as PVDF or PVDF-TrFE that is part of the capacitive voltage divider used to detect a touch. Materials like PVDF or PVDF-TrFE may experience a stronger temperature dependence of capacitance than other dielectric materials such as glass, and therefore sensor 525 may need additional calibration based on temperature. This is in contrast with sensors of other capacitive sensing systems in which capacitance determination is not strongly dependent upon temperature. Accordingly, in some implementations, the capacitance determined using sensor 525 may be adjusted based on the temperature, for example, of sensor 525.

Figure 13:
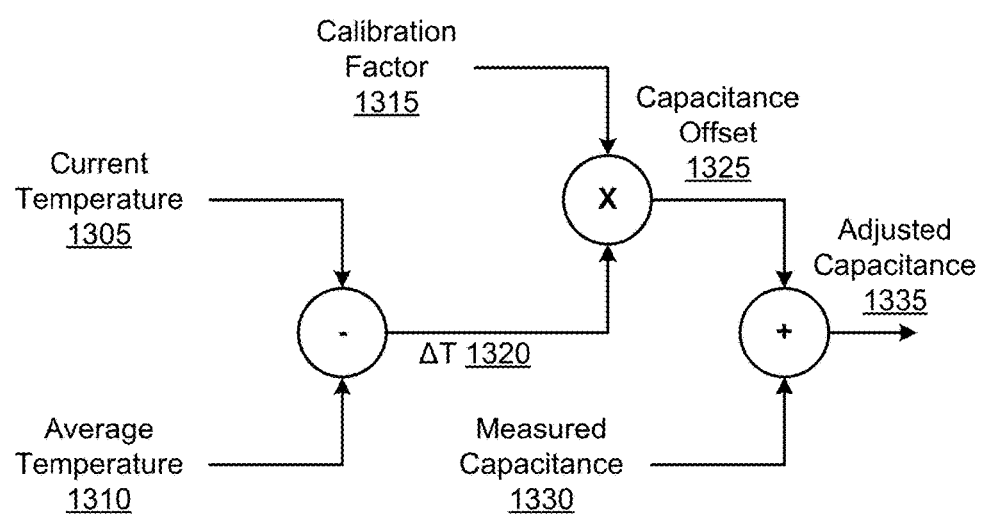
FIG. 13 shows an example of adjusting a capacitance determined using the fingerprint sensor based on temperature.

FIG. 13 shows an example of adjusting a capacitance determined using the fingerprint sensor based on temperature. In FIG. 13, the current temperature of sensor 525 may be determined (e.g., by controller circuit 520) to generate current temperature 1305 using, for example, a temperature-sensitive p-n junction diode formed as part of the sensor circuitry on or in the sensor substrate. Additionally, the average temperature of sensor 525 may be determined to generate average temperature 1310. Average temperature 1310 may be a running average of several past temperatures of sensor 525 and incorporate current temperature 1305 to provide a new, updated average temperature 1310 of sensor 525. In some implementations, the average temperature may be the output of a first- or second-order finite impulse response (FIR) filter or infinite impulse response (IIR) filter operating on a stream of temperature measurements from the temperature-sensitive diode. Current temperature 1305 may be subtracted from average temperature 1310 (or vice versa) to generate ΔT 1320 representing the difference in temperature between current temperature 1305 and average temperature 1310. ΔT 1320 may then be adjusted (e.g., multiplied) by calibration factor 1315. Calibration factor 1315 may be an adjustment representing process variations and other deviations that can be corrected for during a calibration process based on how sensor 525 was manufactured. Accordingly, capacitance offset 1325 may be generated. Measured capacitance 1330 may be the capacitance of the object (or portion thereof) on or near the receiver bias electrode as measured by sensor 525. Measured capacitance 1330 may then be adjusted (e.g., offset by adding, subtracting, etc.) based on capacitance offset 1325 to generate adjusted capacitance 1335. If adjusted capacitance 1335 corresponds to a capacitance similar to that of a finger, then the ultrasonic sensing mode may begin, as previously discussed.

Figure 14:
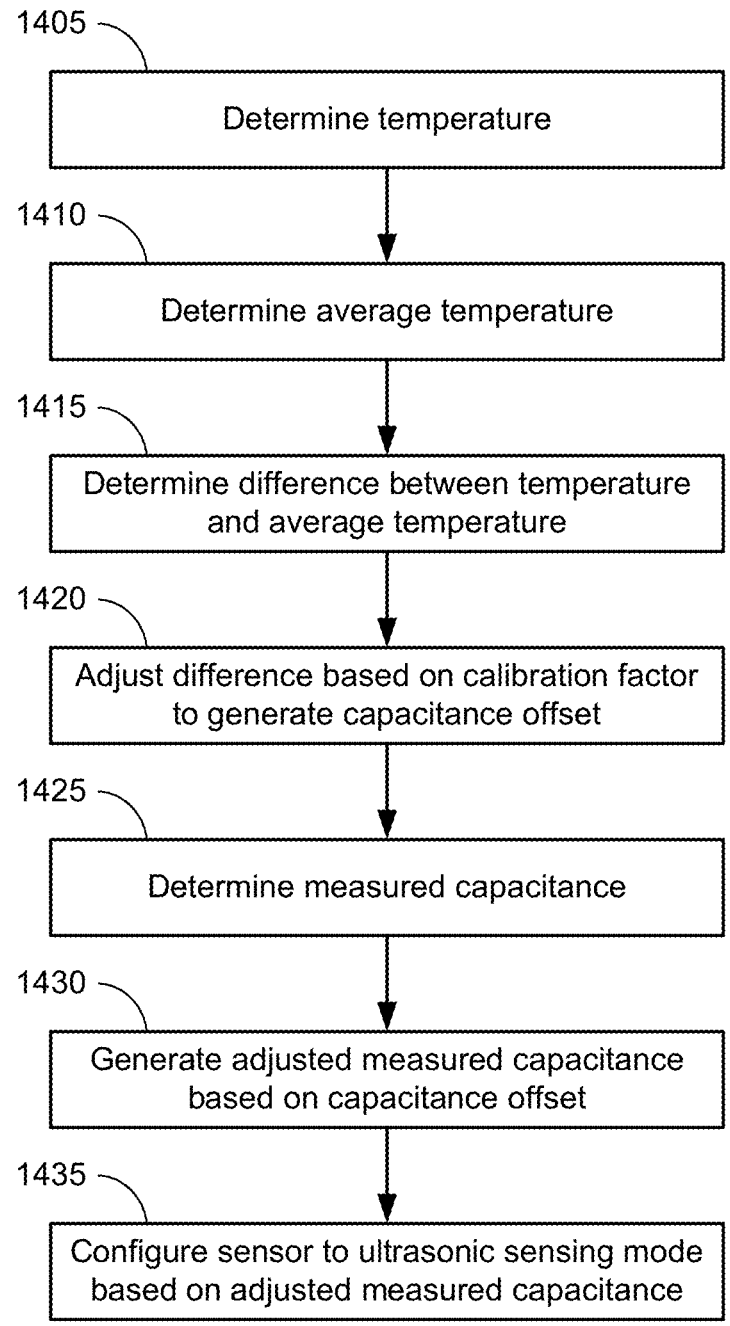
FIG. 14 shows an example of a flowchart for adjusting the capacitance determined using a fingerprint sensor.

FIG. 14 shows an example of a flowchart for adjusting the capacitance determined using the fingerprint sensor. In FIG. 14, at block 1405, the temperature may be determined. For example, controller circuit 520 may determine the temperature when sensor 525 is operating in the capacitive sensing mode. Next, at block 1410, the average temperature may be determined. For example, controller circuit 520 may keep track of a running average of the temperature of sensor 525, and therefore, the running average may be updated to take into account the temperature determined at block 1405. The running average may be based on hundreds or thousands of measurements, or more.

At block 1415, the difference between the temperature determined at block 1405 and the average temperature determined at block 1410 may be determined. At block 1420, controller circuit 520 may use the difference obtained from block 1415 and adjust the difference by applying a calibration factor to generate a capacitance offset. Next, at block 1425, the measured capacitance may be determined. For example, sensor 525 may be in the capacitive sensing mode and a voltage may be read out by controller circuit 520, as previously discussed, and correlated with a capacitance that may be used to determine whether the object touching or near the receiver bias electrode is a finger. At block 1430, the measured capacitance may be adjusted by the capacitance offset to generate an adjusted measured capacitance. This adjusted measured capacitance represents the capacitance of the object, or a portion of the object, while taking into account the temperature dependence of sensor 525 on the capacitance determination. At block 1435, the sensor may be configured to operate in the ultrasonic sensing mode based on the adjusted measured capacitance. For example, if the adjusted measured capacitance is within a threshold capacitance range representative of a finger, then controller circuit 520 may configure sensor 525 to operate in the ultrasonic sensing mode, as previously discussed.

As another example of adjusting the measured capacitance 1330 to provide an adjusted capacitance 1335, the measured capacitance 1330 may be adjusted to account for manufacturing variations of the fingerprint sensor 525. Manufacturing variations may include variations in the dielectric constant and thickness of the cover glass, ink layers, various adhesives and other layers formed during manufacturing of the sensor. Manufacturing variations may lead to unit-to-unit variations in the capacitance change when a user touches or is positioned near a sensing electrode of the fingerprint sensor. The capacitance change when a user touches or is positioned near a sensing electrode of the fingerprint sensor may be referred to as the "touch capacitance". The variation in touch capacitance due to manufacturing variations may change the response due to a "partial touch" where a finger of a user is in contact with only a portion of the active area of the sensor. Variations in unit-to-unit touch capacitance and sensitivity to a partial touch of a user may lead to a less than satisfactory user experience if not accommodated. For example, a thicker cover glass, ink or adhesive layer and/or a lower cover glass, ink or adhesive dielectric constant will lead to a lower touch capacitance without corresponding adjustments, and the mobile device may be less sensitive to a partial touch of a user and may need to be contacted by a larger portion of a finger for finger detection compared to another mobile device with nominal thicknesses and dielectric constants. Alternatively, a thinner cover glass, ink or adhesive layer and/or a higher cover glass, ink or adhesive dielectric constant will lead to a higher touch capacitance, and the mobile device may be more sensitive to a partial touch of a finger, which may lead to inadvertent detection by a non-finger object.

A method of calibrating a capacitive sensing electrode of a fingerprint sensor for detecting a touch of a finger and to account for various manufacturing variations uses the fingerprint sensor to determine the contact area of a finger or of a finger calibration target that is in contact with or in partial contact with the active area of the fingerprint sensor and then using the determined contact area to provide an adjusted capacitance 1335. The finger calibration target may include a finger-like material that may be positioned on the sensing electrode of the fingerprint sensor during a calibration sequence performed at a factory during an assembly and test process. In some implementations, the touch capacitance of a user may be measured during a fingerprint enrollment process and adaptively refined during subsequent fingerprint authentication processes.

During a first step, a touch capacitance may be measured and a fingerprint image may be acquired during an enrollment process or a subsequent authentication process. The capacitance measurement and the fingerprint image acquisition may be taken consecutively during the same finger contact event. For example, the fingerprint image may be acquired before the capacitance measurement or the fingerprint image may be acquired after the capacitance measurement. During a second step, the contact area of the user's finger on the active area of the fingerprint sensor may be estimated or otherwise determined from the acquired fingerprint image using, for example, visual features such as fingerprint ridges, valleys and minutiae, or using differences and variances of gray-level values of small blocks of sensor pixels in the ultrasonic sensor array to determine a fingerprint boundary between air and an object such as a finger and determining the contact area from the determined fingerprint boundary. During a third step, a full-contact touch capacitance may be calculated, which is the touch capacitance when a user's finger contacts the entire sensor active area. The full-contact touch capacitance may be calculated from the ratio of the sensor active area divided by the determined finger contact area. The calculated full-contact touch capacitance may be refined by making additional capacitance measurements and determinations of finger contact area and calculating an average, median or other appropriate statistical measure of the full-contact touch capacitance. The full-contact touch capacitance may be initially calculated during fingerprint enrolling and adaptively adjusted or refined during subsequent fingerprint matching and authentication processes. During a fourth step, a touch detection threshold and a lift detection threshold may be adjusted or otherwise determined in accordance with the full-contact touch capacitance, which may be based in part on the contact area of the finger in contact with the fingerprint sensor. In some implementations with a nominal cover-glass thickness, the touch detection threshold may be set equal to about one quarter of the full-touch capacitance. For example, if the full-contact touch capacitance is determined to be 100 picofarad (pF), the touch detection threshold may be set equal to 25 pF. In an example where the cover glass of the mobile device is thinner than nominal and the full-contact touch capacitance is determined to be 110 pF, the touch detection threshold may be set equal to 27.5 pF. In an example where the cover glass of the mobile device is thicker than nominal and the full-contact touch capacitance is determined to be 90 pF, the touch detection threshold may be set equal to 22.5 pF. In a similar manner, the lift detection threshold that aids in determining when a finger has been lifted from the sensor may be adjusted accordingly. In some implementations, once a finger has been lifted and the measured capacitance is below the touch detection threshold, the non-contact baseline capacitance may be measured and stored as a baseline no-touch capacitance value that may be compared with partial- or full-touch capacitances and prior no-touch baseline capacitance values to determine or adjust the touch detection threshold or the lift detection threshold. In some implementations, the touch detection threshold and/or the lift detection threshold may be stored with the enrollment templates of a user generated during an enrollment process.

To further reduce the temperature dependence of the measured capacitance 1330, the capacitance of the piezoelectric receiver layer 436 may be cancelled using an active shield method. The capacitance of the piezoelectric receiver layer 436 (or piezoelectric transceiver layer 456 in some implementations) may be an increased function of temperature as the dielectric constant of the PVDF or PVDF-TrFE piezoelectric layer may vary with temperature more than other dielectric materials in the sensor 525. When the active shield method is employed, one or more lower electrodes (such as one or more pixel input electrodes 438) that are coupled to a lower surface of the piezoelectric receiver layer 436 may be driven with a buffered version of the drive signal that is used to drive the receiver bias electrode 440 (or transceiver bias electrode 460 in some implementations). The buffered drive signal generated by controller circuitry associated with the controller may be provided to one or more electrodes of the fingerprint sensor when the fingerprint sensor is configured in the capacitive sensing mode. The receiver bias electrode 440 may serve as a sensing electrode and as an upper electrode for the capacitor with piezoelectric receiver layer 436 as the dielectric layer. For example, if the drive signal applied to the receiver bias electrode 440 is increased by 0.5V, the buffered drive signal applied to the lower electrode(s) of piezoelectric receiver layer 436 may also be increased by 0.5V. Similarly, if the drive signal applied to the receiver bias electrode 440 is decreased by 0.7V, the buffered drive signal applied to the lower electrode(s) of piezoelectric receiver layer 436 may also be decreased by 0.7V. The lower electrode(s) of piezoelectric receiver layer 436 may therefore serve as an active shield to cancel the capacitance of piezoelectric receiver layer 436 along with the associated temperature dependence. In some implementations, the drive signal used to drive the receiver bias electrode 440 in a capacitive sensing mode may be generated by active-cancellation circuitry that may include amplifiers and signal conditioning circuits such as continuous-time filters. In some implementations, the active-cancellation circuitry may be implemented in controller 214. The active-cancellation circuitry may use the drive signal applied to the receiver bias electrode 440 as an input to generate the buffered drive signal that may be connected to the lower electrode(s) of piezoelectric receiver layer 436.

Microcontroller 1120, controller circuit 520 and applications processor 530 may include a variety of circuitry to implement the techniques discussed herein. For example, microcontroller 1120, controller circuit 520 and applications processor 530 may each include (or have access to) one or more processors, memory, and other hardware components or circuits. The processors may be used to execute stored instructions in memory to implement the techniques disclosed herein.

Figure 15A:
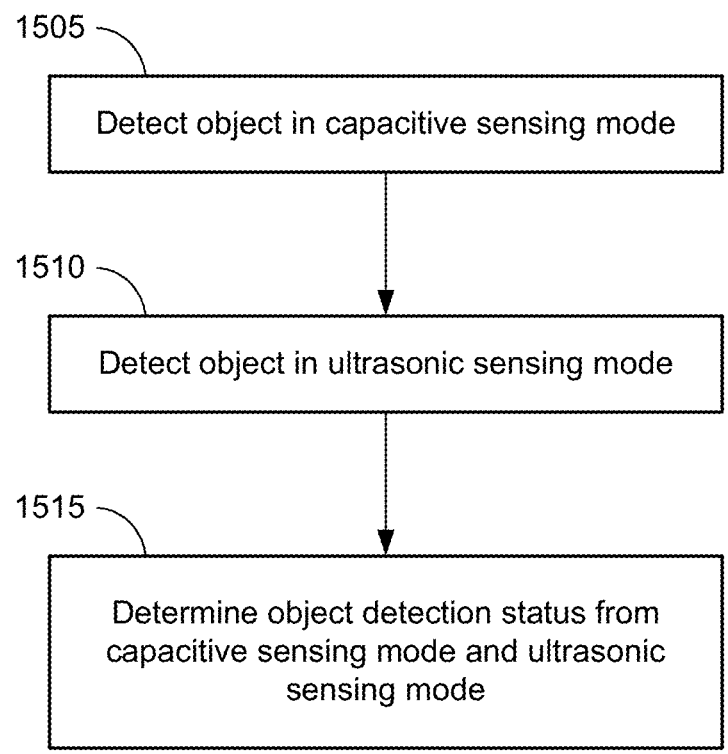
FIG. 15A shows an example of a flowchart for a method of using a capacitive sensing mode and an ultrasonic sensing mode for detecting the presence of an object using a fingerprint sensor.

FIG. 15A shows an example of a flowchart for a method of using a capacitive sensing mode and an ultrasonic sensing mode for detecting the presence of an object using a fingerprint sensor 525 as illustrated in FIG. 5 and described with respect to FIGS. 1-14. When an object such as a finger 515 is positioned on or near a sensing electrode of the fingerprint sensor 525, the finger may be detecting using the fingerprint sensor operating in a capacitive sensing mode as shown in block 1505. A finger detected using the capacitive sensing mode may also be detected with the fingerprint sensor operating in the ultrasonic mode, as shown in block 1510. In some implementations, the fingerprint sensor may be configured to operate in the ultrasonic sensing mode when a touch from a finger or other object has been detected in the capacitive sensing mode. The combination of the capacitive detection and the ultrasonic detection of the finger may be used to determine an object detection status with a higher level of certainty, as shown in block 1515. An affirmative object detection status may be used, for example, to send an interrupt signal to an associated applications processor and proceed with waking up the applications processor, authenticating the finger and unlocking the device. In some implementations, the interrupt signal may be provided to the applications processor to represent that a finger corresponding to a touch has been detected by the fingerprint sensor operating in the capacitive sensing mode, ultrasonic sensing mode, or both the capacitive sensing mode and the ultrasonic sensing mode.

Figure 15B:
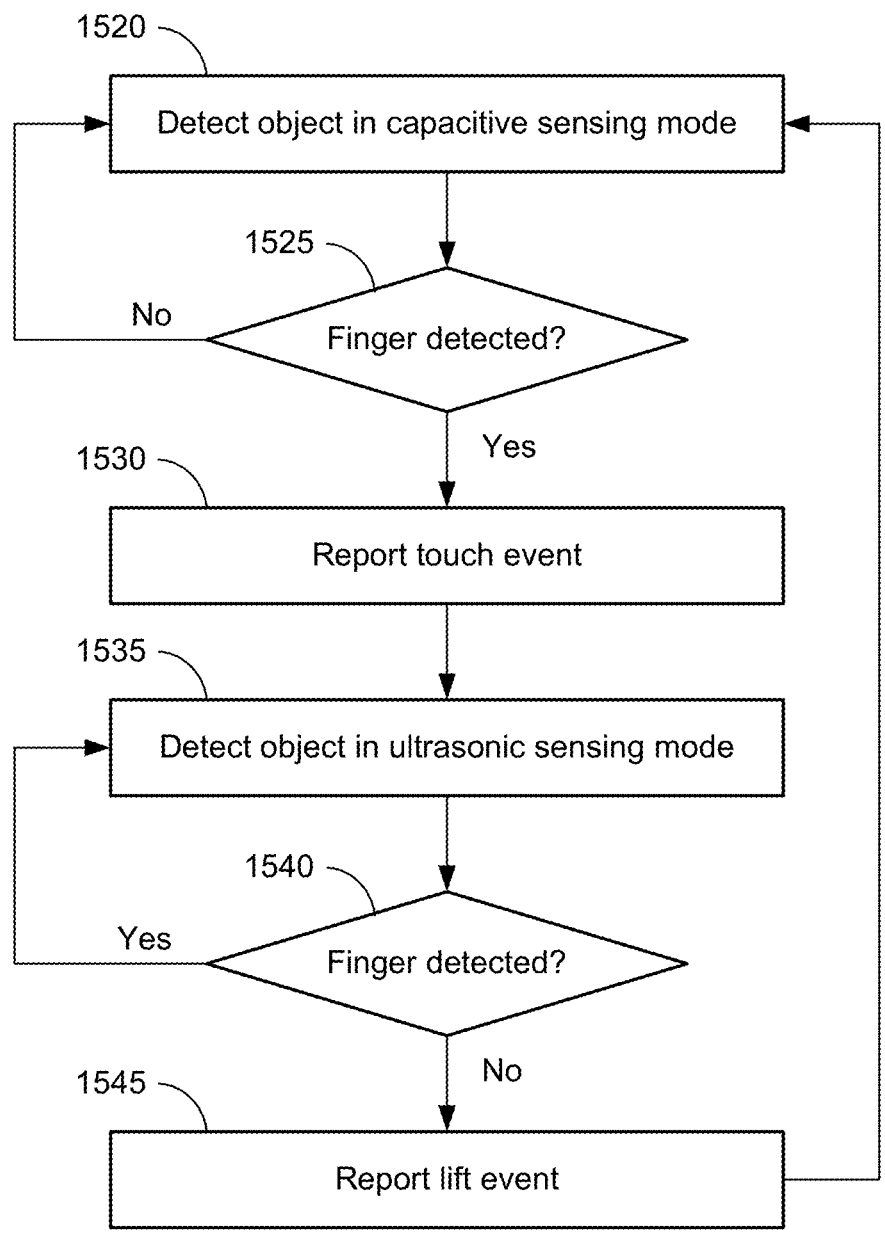
FIG. 15B shows an example of a flowchart for a method of using a capacitive sensing mode to initially detect the presence of an object and an ultrasonic sensing mode to detect continued presence of the object and to detect when the object has been lifted using a fingerprint sensor.

FIG. 15B shows an example of a flowchart for a method of using a capacitive sensing mode to initially detect the presence of an object, as shown in block 1520. If no object or finger has been detected, the capacitive sensing mode may be invoked on a periodic basis (for example, on the order of five to twenty times a second) as depicted by the "no" path from bock 1525. If an object/finger has been detected, then a touch event may be reported as shown in block 1530. The reporting of the touch event may include sending an interrupt signal to the applications processor as described with respect to block 1515 of FIG. 15A. An ultrasonic sensing mode may be used to detect the continued presence of the object/finger, as shown in block 1535 and block 1540, and to report when the object/finger has been lifted as shown in block 1545. The reported finger lift event may cause the sensor system to return to the low-power capacitive sensing mode, as shown in block 1520. In some implementations, a controller, fingerprint sensor and one or more sensing electrodes may be configured to report a finger lift event while operating in either the capacitive sensing mode, the ultrasonic sensing mode, or both the capacitive sensing mode and the ultrasonic sensing mode.

Figure 15C:
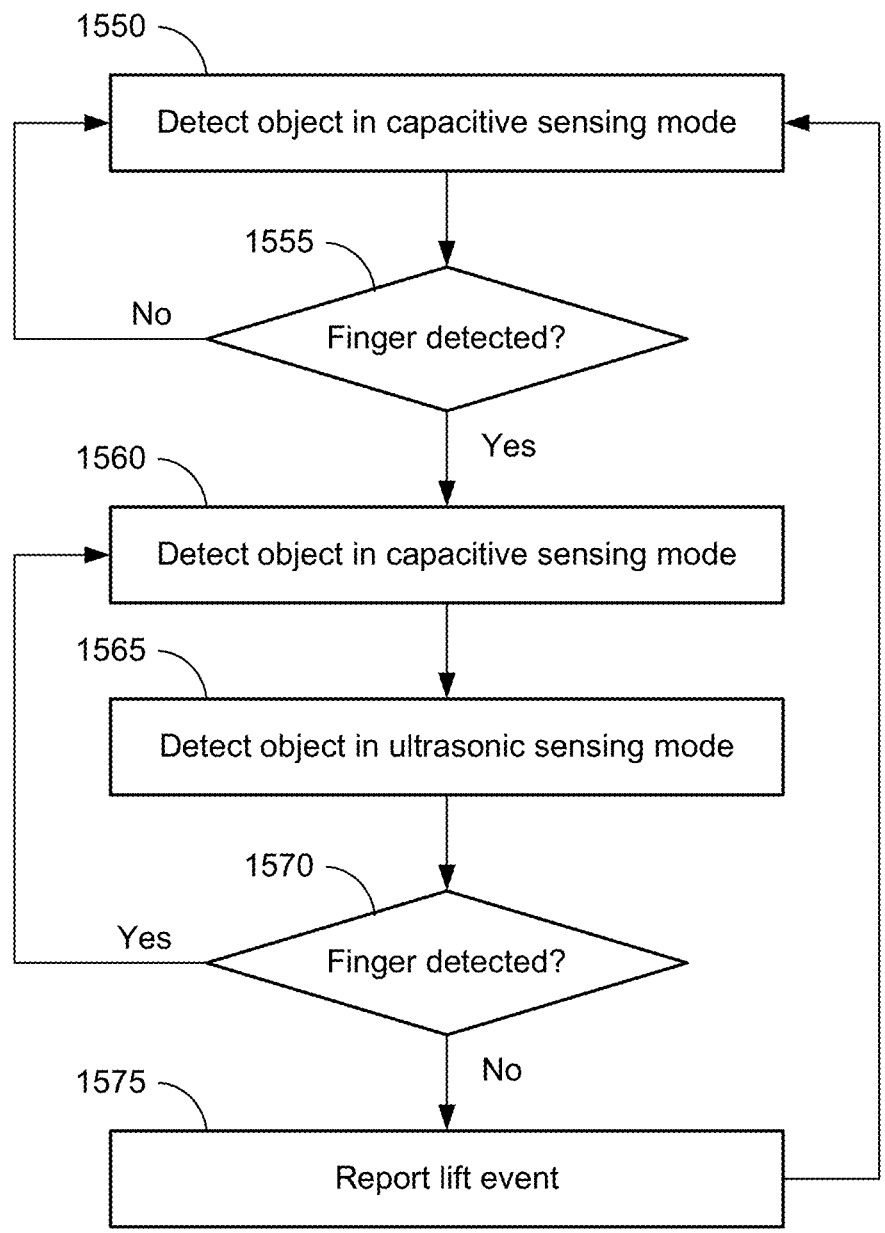
FIG. 15C shows an example of a flowchart for a method of using a capacitive sensing mode to initially detect the presence of an object and both an ultrasonic sensing mode and the capacitive sensing mode to detect continued presence of the object and to detect when the object has been lifted using a fingerprint sensor.

FIG. 15C shows an example of a flowchart for a method of using a capacitive sensing mode to initially detect the presence of an object, as shown in block 1550. If no object or finger has been detected, the capacitive sensing mode may be invoked on a regular or periodic basis as shown with the "no" path from bock 1555. If an object/finger has been detected, then a touch event may be reported. Both the capacitive detection mode and an ultrasonic detection mode may be used to quasi-continuously determine that the object/finger remains in contact with or is close to the sensing electrode as shown in block 1560 and block 1565. When the presence of the object/finger is no longer detected with both the capacitive and ultrasonic sensing modes, a finger lift event may be reported as shown in block 1570 and block 1575. The reported finger lift event may cause the sensor system to return to the low-power capacitive sensing mode, as shown in block 1550.

Alternatively or in addition to the capacitance and ultrasonic sensing methods shown and described with respect to FIGS. 15A-15C, decision logic to wake up the applications processor and authenticate a fingerprint may use input from one or more accelerometers and gyroscopes included in the mobile device. The in-device accelerometers and gyroscopes may provide indication of changes in motion and/or orientation of the mobile device that may indicate user intent to wake up and use the mobile device. The accelerometers and gyroscopes may include one or more microelectromechanical (MEMS) sensors, analog-mixed-signal circuits and signal processing, and microcontrollers. The accelerometers and gyroscopes may include embedded firmware and algorithms, which can execute algorithms to detect and quantify the magnitude and direction of changes in motion and/or orientation of the mobile device. The accelerometers and gyroscopes along with associated firmware and algorithms may be included in self-contained modules in the mobile device. In some implementations, the accelerometers and gyroscopes may leverage signal processing and/or computational capabilities and control functions of a shared sensor-core device or of a dedicated section such as a low-power island of the applications processor in the mobile device. Output signals from the in-device accelerometers or gyroscopes that indicate a change in motion or a change in orientation of the mobile device may be used by the controller to configure one or more sensing electrode in either the capacitive sensing mode or the ultrasonic sensing mode in anticipation of an impending touch event.

In some implementations that use motion and/or orientation sensing by the accelerometers and gyroscopes, the rate of capacitive and/or ultrasonic sensing for finger detection may be altered based on indications from accelerometer and gyroscope signals. For example, detection of motion may lead to capacitive sensing and/or ultrasonic sensing to be performed more frequently. In another example when no motion or change in orientation has been detected for an extended period, capacitive and/or ultrasonic sensing for finger detection may be performed less frequently. The controller may be configured to adjust a finger detection rate in the capacitive sensing mode or the ultrasonic sensing mode upon indication of a change in motion or a change in orientation from an in-device accelerometer or an in-device gyroscope.

In another example of using motion and/or orientation sensing by the in-device accelerometers and gyroscopes, detection thresholds used by the capacitive sensing and ultrasonic sensing algorithms may be altered based on accelerometer and gyroscope inputs. For example, detection of rotation of the mobile device towards the user by the accelerometers and/or gyroscopes may indicate a higher probability that the user intends to use the mobile device and the capacitive sensing and ultrasonic sensing detection thresholds may be configured accordingly with a lower level. Alternatively, detection of rotation of the mobile device away from the user by the accelerometers and/or gyroscopes may indicate a lower probability that the user intends to use the mobile device and the capacitive sensing and ultrasonic sensing detection thresholds may be configured with a higher level. The controller may be configured to adjust the touch detection threshold and/or a finger lift detection threshold upon indication of a change in motion or a change in orientation from an in-device accelerometer or an in-device gyroscope.

In some implementations, the suite of accelerometers and gyroscopes (e.g., angular rate sensors) in the mobile device may be configured to wake up portions of the device in what might be referred to as a shake-and-wake operation. Output signals from one or more accelerometers and/or gyroscopes in the sensor suite may be received by an ASIC or an applications processor associated with the fingerprint sensor to increase the finger detection rate for either the capacitive sensing mode or the ultrasonic sensing mode and to rapidly enable a user to be authenticated. The shake-and-wake operation may, in some examples, turn on a portion of a display to aid the user in an authentication process. In some implementations, the touch detection threshold may be lowered in either the capacitive sensing mode or the ultrasonic sensing mode by detecting a specific range and sequence of output signals from the in-device accelerometers and gyroscopes. In some implementations, the touch detection threshold may be set to zero for either the capacitive sensing mode or the ultrasonic sensing mode if the range and sequence of output signals from the in-device accelerometers and gyroscopes meets an acceptance criterion to reduce latency associated with the authentication process.

Figure 16A:
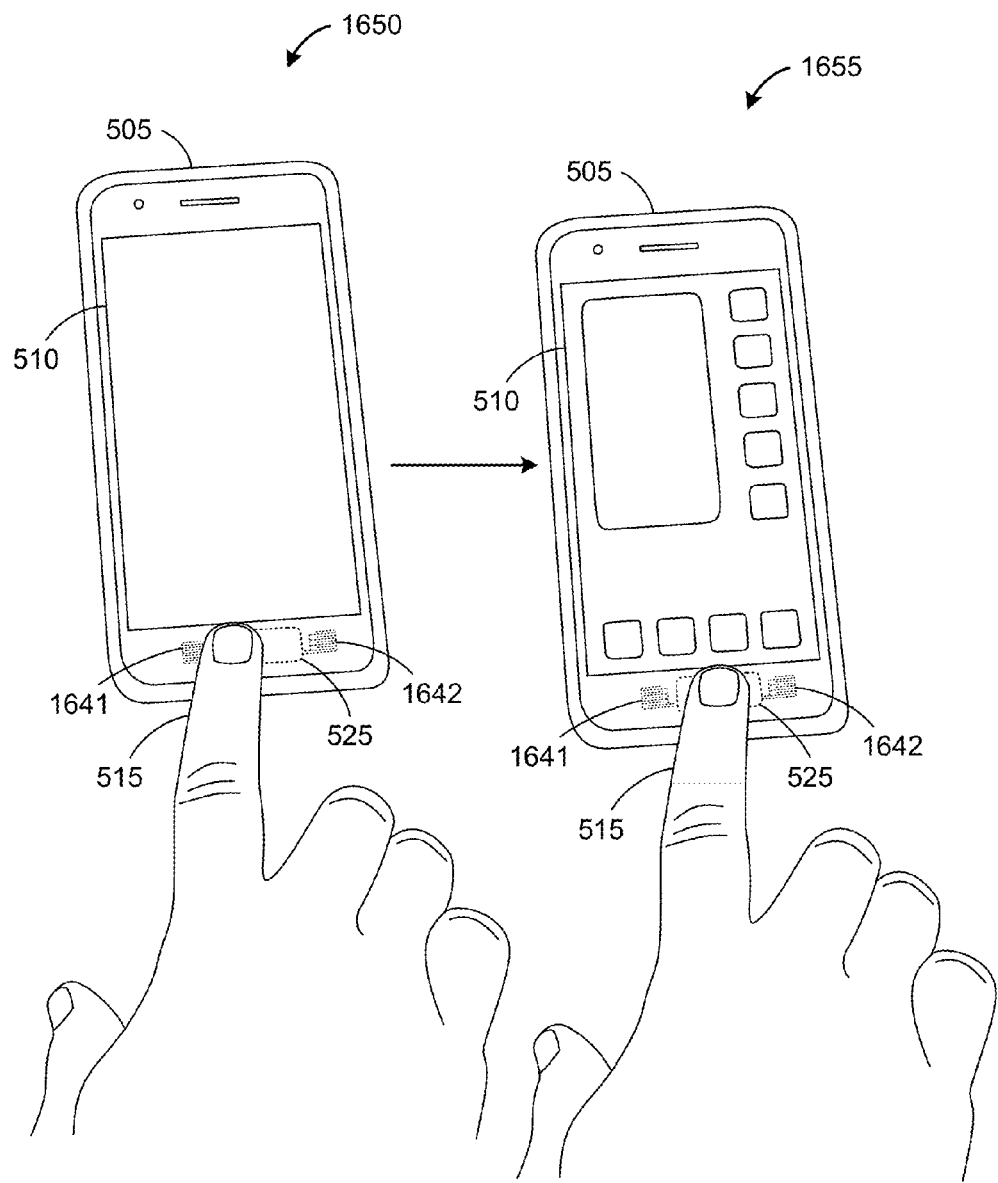
FIG. 16A shows an example of using a capacitive sensing mode and an ultrasonic sensing mode with a fingerprint sensor and one or more associated sensing electrodes to wake up an electronic device.

FIG. 16A shows an example of using a capacitive sensing mode and an ultrasonic sensing mode with a fingerprint sensor 525 having one or more associated sensing electrodes 1641, 1642 to wake up an electronic device 505. Electronic device 505 may include a controller circuit 520 that may switch sensor 525 to operate between a capacitive sensing mode and an ultrasonic sensing mode as described above with respect to FIG. 5 and FIG. 6. The electronic device 505 may be in a locked state in which an applications processor 530 and display 510 of the electronic device 505 are turned off or are in a low-power sleep mode. For example, in FIG. 16A at time 1650, electronic device 505 is in a locked state. This results in display 510 being turned off and applications processor 530 turned off or operating or in a relatively low-power sleep mode.

An object such as a finger 515 may be detected using the capacitive sensing mode and one of the sensing electrodes 1641, 1642. For example, in FIG. 16A at time 1650, finger 515 is positioned on or near sensing electrode 1641 and is detected using the sensor 525 with the sensing electrode 1641 operating in a capacitive sensing mode. In the implementation shown, sensing electrodes 1641 and 1642 are conductive electrodes (e.g., interdigitated electrodes) formed under the cover glass of the electronic device 505. In some examples, the sensing electrodes 1641 and 1642 may be screen-printed onto the inside of the cover glass or formed as part of a flexible printed circuit (e.g., "flex") that is adhered to the inside of the cover glass and that may be connected directly to the finger sensor 525. In some implementations, sensing electrodes 1641 and 1642 may be configured as substantially square, rectangular or other suitably shaped electrodes.

If an object such as a finger 515 is detected using the capacitive sensing mode, then whether the object is a finger may be determined using an ultrasonic sensing mode. Sensor 525 may transmit and receive ultrasonic waves to provide image data corresponding with a full or partial fingerprint image of finger 515. If it is determined that the object is a finger, then the controller circuit 520 may wake up the applications processor 530 and in some implementations, controller circuit 520 or applications processor 530 may also turn on display 510 and fingerprint authentication may be performed. If the fingerprint image data corresponds to a fingerprint of an authorized user of the electronic device 505, the electronic device 505 may be unlocked. For example, in FIG. 16A at time 1655 as the finger 515 moves over the sensor 525, the capacitive sensing mode using sensing electrodes 1641, 1642 or a receiver bias electrode of sensor 525 may be intertwined with the ultrasonic sensing mode to detect and authenticate the finger 515 after which the display 510 may be turned on and the electronic device 505 unlocked. In some implementations, sensing electrodes 1641 and 1642 associated with the fingerprint sensor 525 may be configured and coupled to the controller circuit 520 so that signals may be provided to and from the sensing electrodes 1641 and 1642 when operating the fingerprint sensor 525 in the capacitive sensing mode, while the receiver bias electrode of sensor 525 may be configured and coupled to the controller circuit 520 so that signals may be provided to and from the receiver bias electrode when operating the fingerprint sensor 525 in the ultrasonic sensing mode. As described above with respect to FIG. 16A, the sensing electrodes 1641 and 1642 and the receiver bias electrode of the fingerprint sensor 525 may be positioned under a cover glass of a mobile device.

Figure 16B:
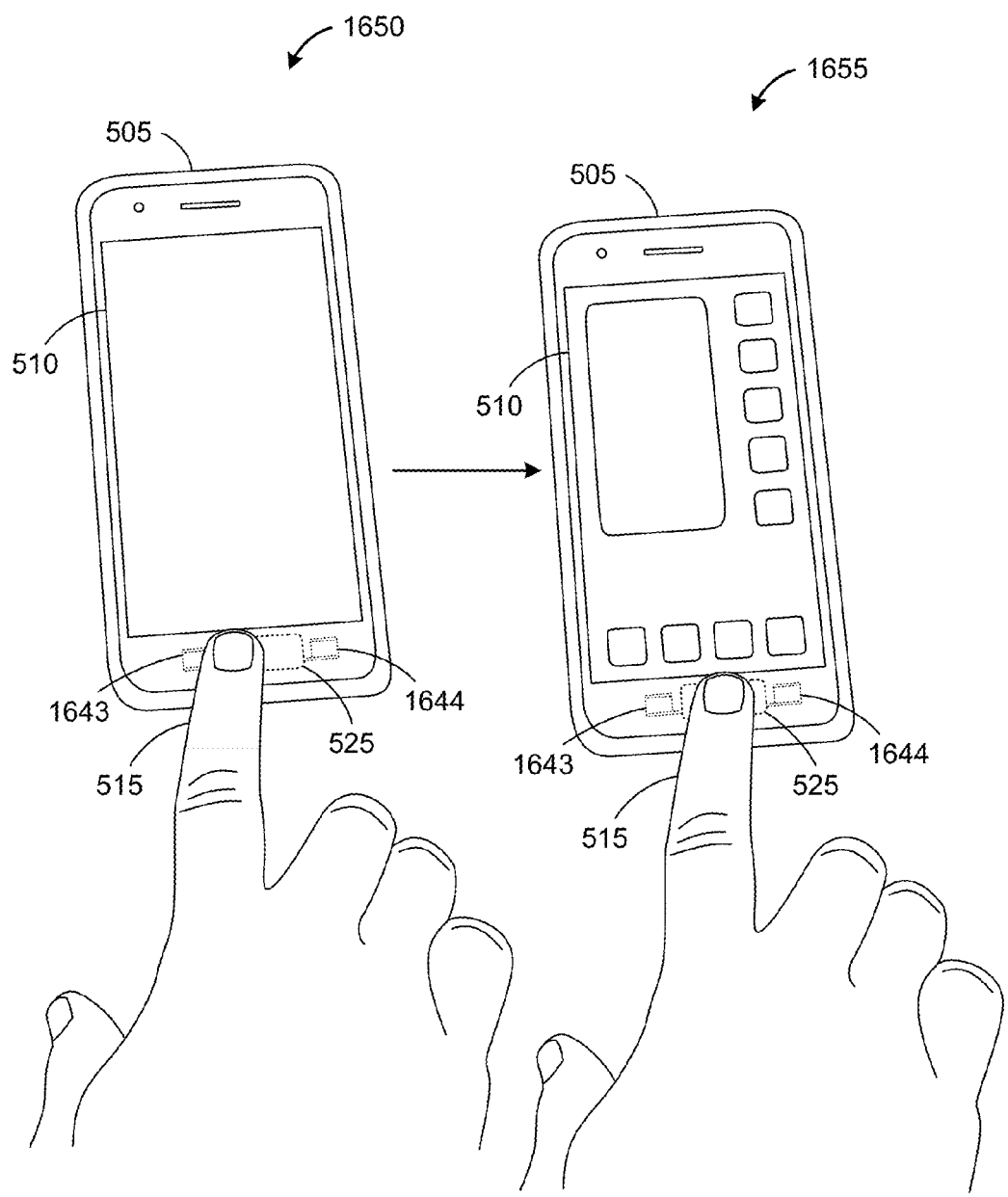
FIG. 16B shows another example of using a capacitive sensing mode and an ultrasonic sensing mode with a fingerprint sensor and one or more associated sensing electrodes to wake up an electronic device.

FIG. 16B shows another example of using a capacitive sensing mode and an ultrasonic sensing mode with a fingerprint sensor 525 and one or more sensing electrodes 1643, 1644 associated with the fingerprint sensor 525 to wake up an electronic device 505. As described with respect to FIG. 16A, electronic device 505 may include a controller circuit 520 that may switch sensor 525 and/or sensing electrodes 1643, 1644 to operate between a capacitive sensing mode and an ultrasonic sensing mode as described above with respect to FIG. 5 and FIG. 6. As shown in FIG. 16B at time 1650, electronic device 505 may be in a locked state. Finger 515 may be detected using a capacitive sensing mode and/or an ultrasonic mode with one of the sensing electrodes 1643, 1644 or a receiver bias electrode of sensor 525. In the implementation shown, sensing electrodes 1643 and 1644 include conductive electrodes and a piezoelectric layer positioned between the conductive electrodes that are disposed under the cover glass or display 510 of the electronic device 505. The sensing electrodes, piezoelectric layer and conductive electrodes form a sensor stack (i.e., a button) that may be used for capacitive sensing and for ultrasonic sensing in either the capacitive sensing mode or the ultrasonic sensing mode. In some examples, the sensing electrodes 1643 and 1644 may be formed on a separate substrate or as part of a flexible printed circuit that is adhered to the inside of the cover glass. In some implementations, sensing electrodes 1643 and 1644 and underlying piezoelectric layers with associated excitation electrodes may be configured as substantially square or rectangular. In some implementations, sensing electrodes 1643 and 1644 and underlying piezoelectric layers may be co-fabricated with and on the same substrate as sensor 525. In some implementations, the sensing electrodes 1643 and 1644 of FIG. 16A (and/or the sensing electrodes 1641 and 1642 of FIG. 16A) in coordination with the sensor 525 may be used as menu, home and back buttons, although other functions and button definitions have been contemplated.

If a finger 515 is detected using the capacitive sensing mode and/or the ultrasonic sensing mode, then the controller circuit 520 may wake up the applications processor 530 and turn on display 510 or perform another function such as validating or authenticating the finger 515. For example, as the finger 515 moves over and above the sensor 525, the capacitive sensing mode and/or the ultrasonic mode using sensing electrodes 1643, 1644 or a receiver bias electrode of sensor 525 may detect the finger 515 and sensor 525 may authenticate the finger 515 after which the display 510 may be turned on and the electronic device 505 unlocked as illustrated in FIG. 16B. In some configurations, one or more of the sensing electrodes 1643, 1644 or the receiver bias electrode of sensor 525 may be configured to detect a finger gesture.

Figure 17:
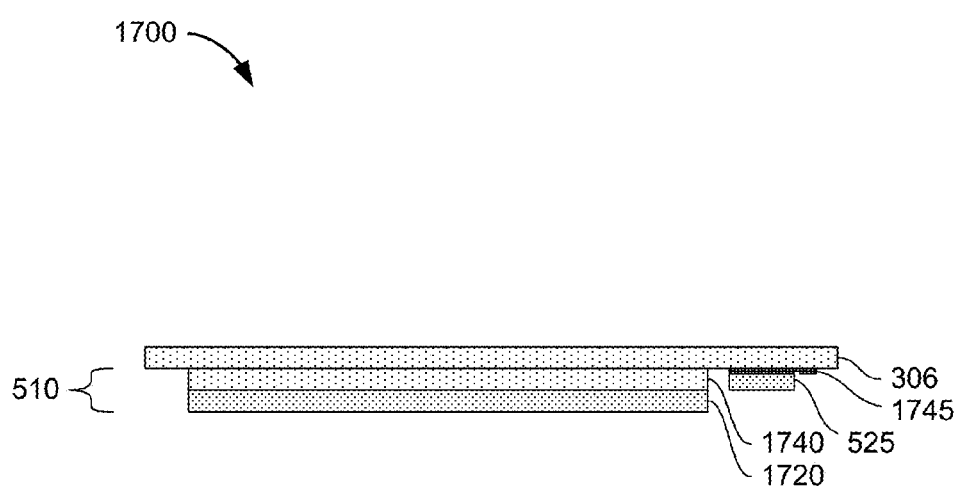
FIG. 17 shows a side view of a configuration with a fingerprint sensor and one or more sensing electrodes positioned underneath a cover glass of a display device.

FIG. 17 shows a side view of a configuration 1700 with a fingerprint sensor 525 and one or more capacitive and/or ultrasonic sensing electrodes 1745 associated with the fingerprint sensor 525 positioned underneath a cover glass of a display 510. The sensor 525 and/or the sensing electrodes 1745 may be configured to operate in a capacitive sensing mode or an ultrasonic sensing mode as described above with respect to FIGS. 1 to 16B. In the example shown in FIG. 17, the sensor 525 is positioned beneath a portion of a common cover layer that may serve as a platen 306 for the sensor 525 and as a touchscreen or cover glass for the display 510. The fingerprint sensor 525 may have a separate substrate or in some implementations have a common substrate with the display 510. The sensing electrodes 1745 may be screen-printed onto the inside of the cover glass or formed as part of a flex (not shown) that is coupled to the inside of the cover glass and that may be connected directly to the finger sensor 525. In some implementations, sensing electrodes 1745 may include one or more conductive electrodes and a piezoelectric layer positioned between conductive interconnecting electrodes. In some implementations, the sensing electrodes 1745 may be formed on a separate substrate or as part of a flexible printed circuit that is adhered to the inside of the cover glass. In some implementations, sensing electrodes 1745 and underlying piezoelectric layers with interconnecting electrodes may be configured as substantially square or rectangular. In some implementations, sensing electrodes 1745 and underlying piezoelectric layers may be co-fabricated with and on the same substrate as sensor 525. In some implementations, the sensor 525 and sensing electrodes 1745 may be peripheral to the active area of the display, which may include a display TFT substrate layer 1720 and a display color filter glass layer 1740. In alternative configurations, the sensor 525 and/or the sensing electrodes 1745 may be positioned on a bezel, on the side or on the back of a mobile device enclosure (not shown). In some implementations, the sensor 525 may be positioned as part of an ultrasonic button. The ultrasonic button may be mechanical or non-mechanical. For example, the ultrasonic button may be mechanically coupled to an electromechanical switch. The ultrasonic button may be authenticating or in some implementations non-authenticating.

Figure 18:
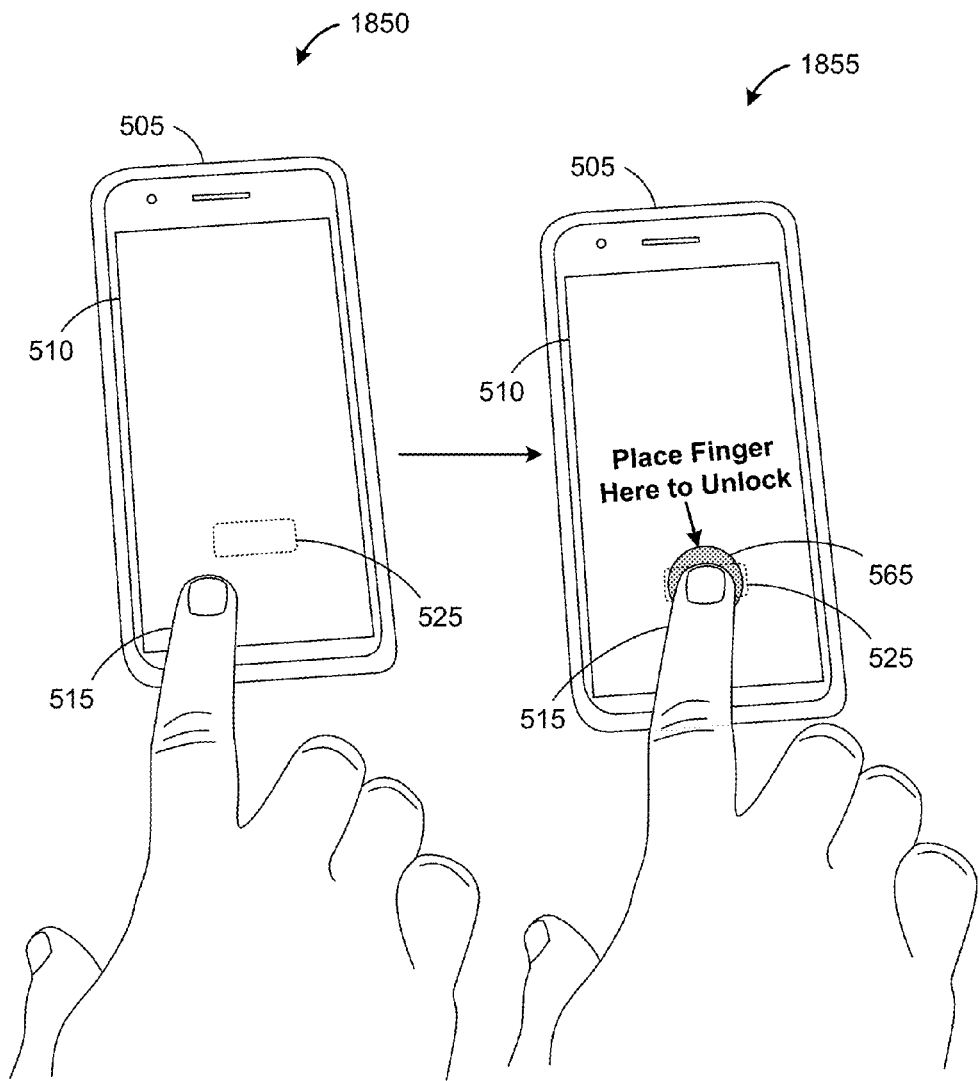
FIG. 18 shows an example of using a capacitive sensing mode and an ultrasonic sensing mode with a fingerprint sensor positioned behind a display of an electronic device to wake up the electronic device.

FIG. 18 shows an example of using a capacitive sensing mode and an ultrasonic sensing mode with a fingerprint sensor 525 positioned behind a display 510 of an electronic device 505 to wake up the electronic device 505. Electronic device 505 may include a controller circuit 520 that may switch sensor 525 to operate between a capacitive sensing mode and an ultrasonic sensing mode as described above with respect to FIG. 5 and FIG. 6. The electronic device 505 may initially be in a locked state in which a display 510 and an applications processor 530 of the electronic device 505 are turned off or in a low-power sleep mode, as illustrated in FIG. 18 at time 1850. When an object such as a finger 515 is detected on or near the sensor 525 using the capacitive sensing mode and/or the ultrasonic sensing mode, a portion of display 510 may turn on to indicate and highlight the position where the fingerprint sensor is located as illustrated in FIG. 18 at time 1855. As depicted in FIG. 18, text indicating "Place Finger Here to Unlock" is shown along with a graphically generated circular icon 565, although many other icons and/or text provided as guidance to a user to indicate the position of the fingerprint sensor have been contemplated. The capacitive and/or ultrasonic sensing modes may continue to be used until the finger 515 is imaged, at which time the image data may be analyzed and the electronic device 505 unlocked if the authentication process is successfully performed. The sensor 525 may be positioned underneath a portion of the display 510, which may be an LCD display, an OLED display or other type of display. In some implementations, one or more electrodes of a touchscreen of electronic device 505 may serve as a sensing electrode for the fingerprint sensor 525 when operating in a capacitive sensing mode, allowing signals from non-active portions of the display 510 without the fingerprint sensor 525 to be ignored by the controller circuit 520 while allowing signals due to a finger touch from active portions of the display 510 with the fingerprint sensor 525 to be detected, further reducing inadvertent wakeup of the electronic device 505.

Figure 19:
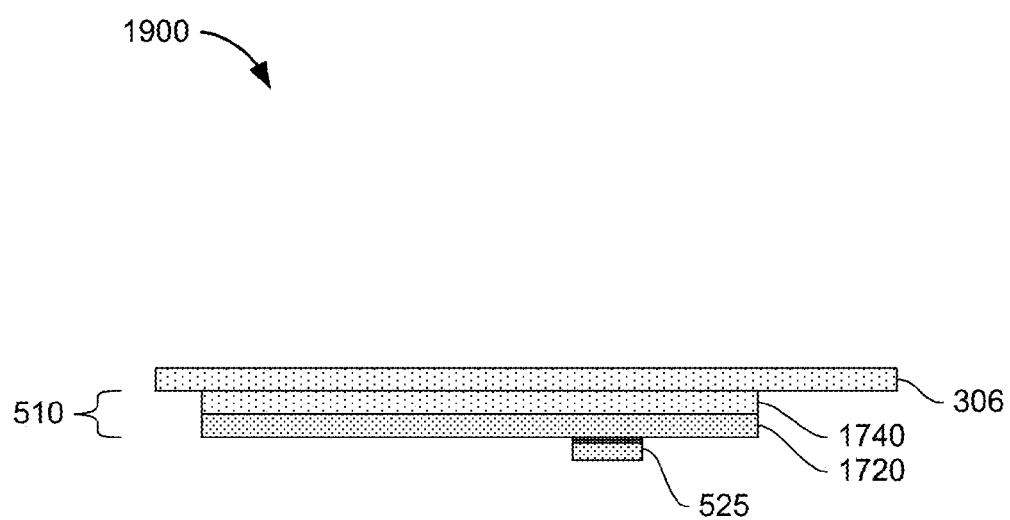
FIG. 19 shows a side view of a configuration with a fingerprint sensor positioned behind a display of a mobile device.

FIG. 19 shows a side view of a configuration 1900 with a fingerprint sensor 525 positioned behind a portion of a display 510. The fingerprint sensor 525 is positioned beneath an LCD or OLED display 510 and a cover glass or touchscreen that serves as a platen 306 for the sensor 525. The sensor 525 and associated sensing electrodes may be configured to operate in a capacitive sensing mode or an ultrasonic sensing mode as described above with respect to FIGS. 1 to 16B. In some implementations, the sensor 525 may be located near the top, bottom, edge or in somewhere in an interior portion of the display, which may include a TFT substrate layer 1720 and other layers 1740 of an LCD or OLED display. In other examples, the sensor 525 may be positioned beneath or behind all of display 510. In other examples, the sensor 525 may be integrated within the display TFT substrate layer 1720. The sensor 525 may be integrated with the display TFT substrate, sharing common TFT substrates with the active area of the sensor 525 covering some, none or all of the active area of the display.

Figure 20:
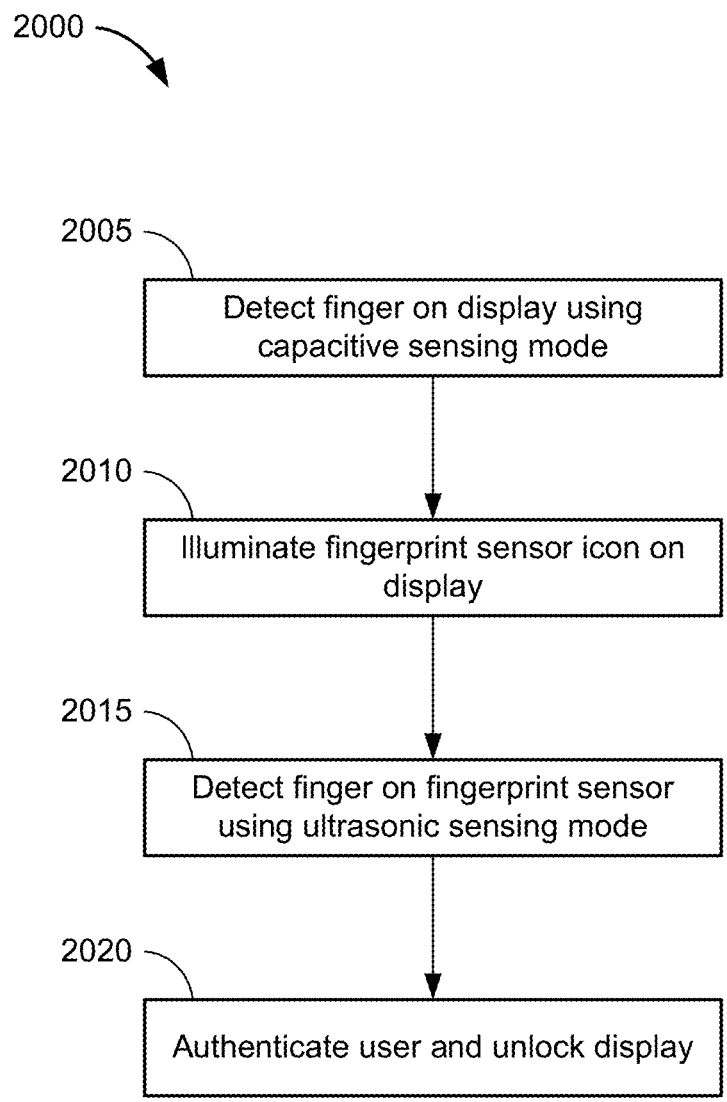
FIG. 20 shows an example of a flowchart for a method of guiding a user of an LCD or OLED display device to position a finger above an under-LCD or under-OLED fingerprint sensor.

FIG. 20 shows an example of a flowchart for a method 2000 of guiding a user of an LCD or OLED display device to position a finger above an under-LCD or under-OLED fingerprint sensor. Graphical display-based icons may be helpful for under-display configurations as use of colored inks or other permanent indicia to mark the position of the fingerprint sensor that may occlude the view of a user of the display device (e.g., a mobile device or an electronic device) can be avoided. In some implementations, the presence of a finger may be detected by capacitive sensing electrodes of a touchscreen overlying the display while the display is off. In some implementations, dedicated sensing electrodes as part of or near the ultrasonic fingerprint sensor may be used to detect the presence of a finger. In block 2005, a finger of a user positioned on a surface of the display may be detected using a capacitive sensing mode, such as described with respect to FIGS. 5-12 above with, for example, the touchscreen or a dedicated sensing electrode. In block 2010, after detecting the presence of the finger, a fingerprint sensor icon may be illuminated on the display. In some implementations, the display may be partially unlocked to display only the fingerprint sensor icon or other selective information to guide the user. In some implementations, a portion of the display may be illuminated while in a low-power mode, and the icon may be enhanced or other selective information provided to the user when the finger is detected. In block 2015, a finger may be detected on the display above the fingerprint sensor using a capacitive sensing mode, an ultrasonic sensing mode, or both a capacitive and ultrasonic sensing mode such as described above with respect to FIGS. 15A-15C. In block 2020, the user may be authenticated and the display unlocked. In alternative configurations such as use of an OLED screen, the display may continuously show the fingerprint sensor icon or other selective information using a subset of the display pixels to guide the user while the mobile device remains locked.

Figure 21:
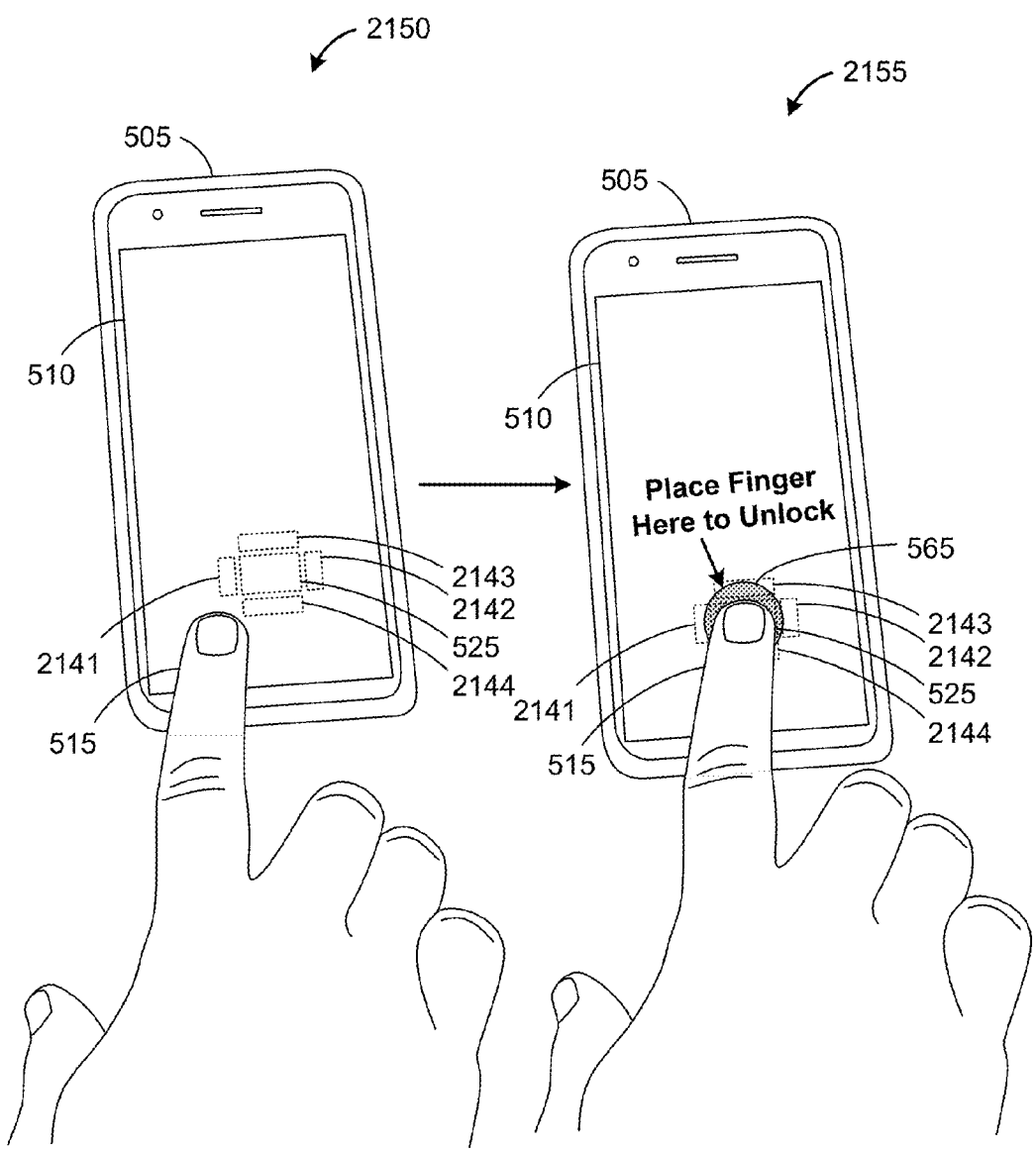
FIG. 21 shows an example of using a capacitive sensing mode and an ultrasonic sensing mode with a fingerprint sensor and one or more associated sensing electrodes positioned behind a display of an electronic device to wake up the electronic device.

FIG. 21 shows an example of using a capacitive sensing mode and an ultrasonic sensing mode with a fingerprint sensor 525 and one or more associated sensing electrodes 2141, 2142, 2143 and 2144 positioned behind a display 510 of an electronic device 505 to wake up or otherwise interact with the electronic device 505. Sensing electrodes 2141, 2142, 2143 and 2144 may include an underlying piezoelectric layer and conductive electrodes to form a sensor stack (i.e., an ultrasonic button) that may be used for capacitive sensing or for ultrasonic sensing in either the capacitive sensing mode or the ultrasonic sensing mode. Electronic device 505 may include a controller circuit 520 that may switch sensor 525 with a receiver bias electrode and/or sensing electrodes 2141, 2142, 2143, 2144 to operate between a capacitive sensing mode and an ultrasonic sensing mode as described above with respect to FIG. 5 and FIG. 6. The electronic device 505 may initially be in a locked state in which display 510 and an applications processor 530 of the electronic device 505 are turned off or in a low-power sleep mode, as illustrated in FIG. 21 at time 2150. When an object such as a finger 515 is detected on or near the sensor 525 or sensing electrodes 2141, 2142, 2143, 2144 using the capacitive sensing mode and/or the ultrasonic sensing mode, a portion of display 510 may turn on to highlight where the fingerprint sensor is located as illustrated in FIG. 21 at time 2155. Text such as "Place Finger Here to Unlock" or other suitable text may be shown along with a graphically generated circular icon 565 as applicable to guide a user on where to place a finger for unlocking the mobile device or for initiating another function such as a payment function. The capacitive and/or ultrasonic sensing modes may continue to be used until the finger 515 is imaged, at which time the image data may be analyzed and the electronic device 505 unlocked if the authentication process is successfully performed. The sensor 525 and sensing electrodes 2141, 2142, 2143 and 2144 may be positioned underneath a portion of the display 510 such as an LCD display or an OLED display. The sensor 525 and sensing electrodes 2141, 2142, 2143, 2144 may continue to sense and/or authenticate the user or perform other functions in response to finger gestures and motions of finger 515 such as tapping, double-tapping, touching, swiping, pressing or other indicative motion. In some configurations, one or more of the sensing electrodes 2141, 2142, 2143, 2144 or the receiver bias electrode of sensor 525 may be configured to detect finger gestures. Sensing electrodes 2141, 2142, 2143, 2144 may be coupled to one or more piezoelectric layers to allow capacitive and/or ultrasonic sensing. As illustrated in FIG. 21, sensing electrode 2141 and sensing electrode 2142 may be used to detect motions such as swipes in the left-to-right direction or the right-to-left direction, while sensing electrode 2143 and sensing electrode 2144 may be used to detect motions in the top-to-bottom direction or the bottom-to-top direction. Additional sensing electrodes (not shown) associated with the fingerprint sensor 525 may be located diagonally to fingerprint sensor 525 and at other locations with respect to fingerprint sensor 525 such as a three-by-three (3×3) array or larger to further aid in gesture detection. Sensing electrodes 2141, 2142, 2143 and 2144 may include one or more piezoelectric layers positioned between conductive electrodes to allow operation in either a capacitive mode or an ultrasonic mode.

Figure 22:
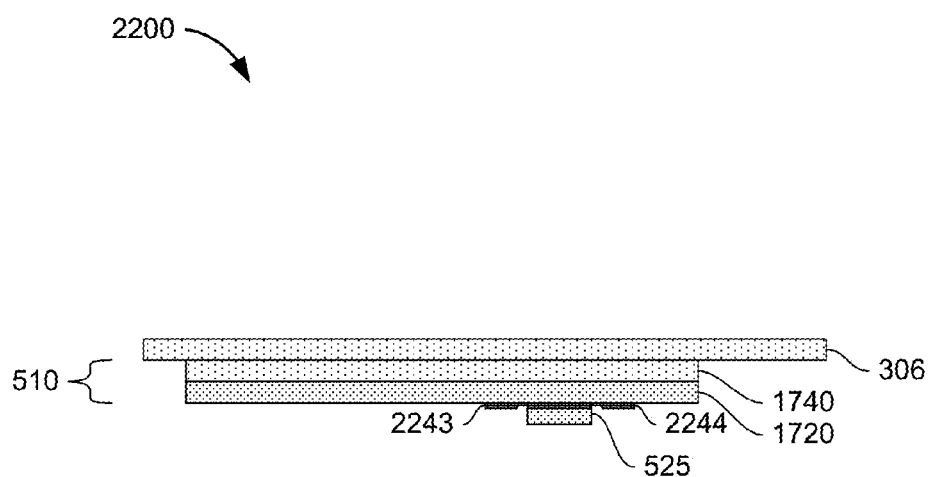
FIG. 22 shows a side view of a configuration with a fingerprint sensor and one or more associated sensing electrodes positioned behind a display of a mobile device.

FIG. 22 shows a side view of a configuration 2200 with a fingerprint sensor 525 and one or more associated sensing electrodes 2243, 2244 positioned behind a display 510 of a mobile device. The fingerprint sensor 525 and sensing electrodes 2243, 2244 are positioned beneath an LCD or OLED display 510 and a cover glass or touchscreen that serves as a platen 306 for the sensor 525. The sensor 525 and/or the sensing electrodes 2243, 2244 or other associated sensing electrodes such as one or more electrodes in or on the touchscreen (e.g., a "touchscreen electrode") may be configured to operate in a capacitive sensing mode or an ultrasonic sensing mode as described above with respect to FIGS. 1 to 21. In some implementations, the sensor 525 may be located near the top, bottom, edge or in somewhere in an interior portion of the display, which may include a TFT substrate layer 1720 and other layers 1740 of an LCD or OLED display. In other examples, the sensor 525 may be positioned beneath or behind all of display 510. In other examples, the sensor 525 may be integrated within the display TFT substrate layer 1720. The sensor 525 and sensing electrodes 2243, 2244 may be integrated with the display TFT substrate, sharing common TFT substrates with the active area of the sensor 525 covering some, none or all of the active area of the display. Sensing electrodes 2243, 2244 may be coupled to one or more piezoelectric layers and associated conductive electrodes to allow operation in capacitive and/or ultrasonic modes.

Figure 23A:
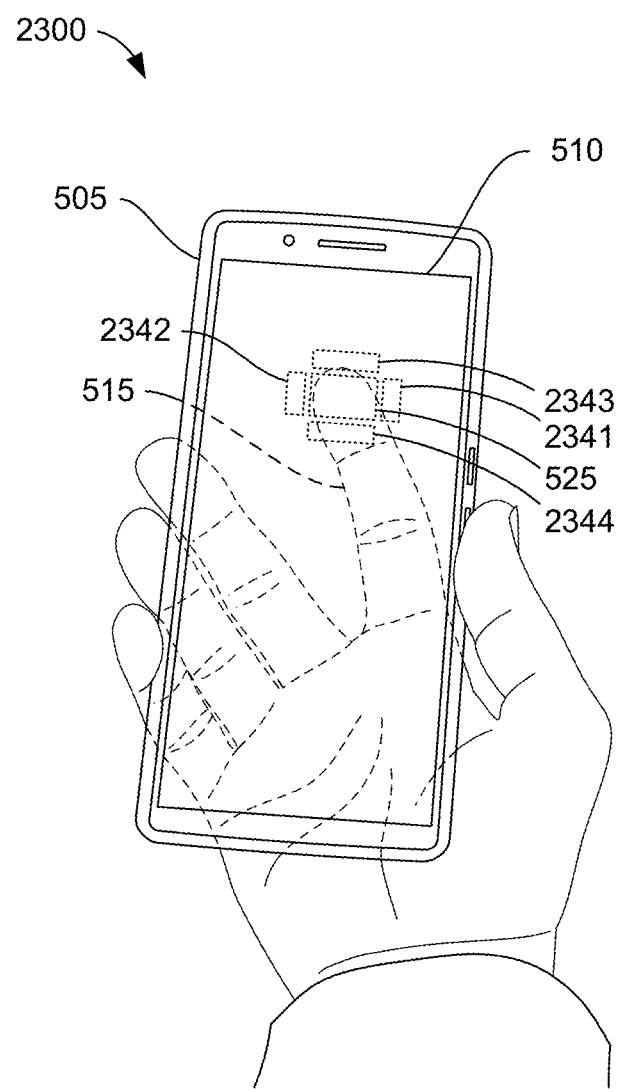
FIG. 23A shows an example of using a capacitive sensing mode and an ultrasonic sensing mode with a fingerprint sensor and one or more associated sensing electrodes positioned behind a back cover of an electronic device.
Figure 23B:
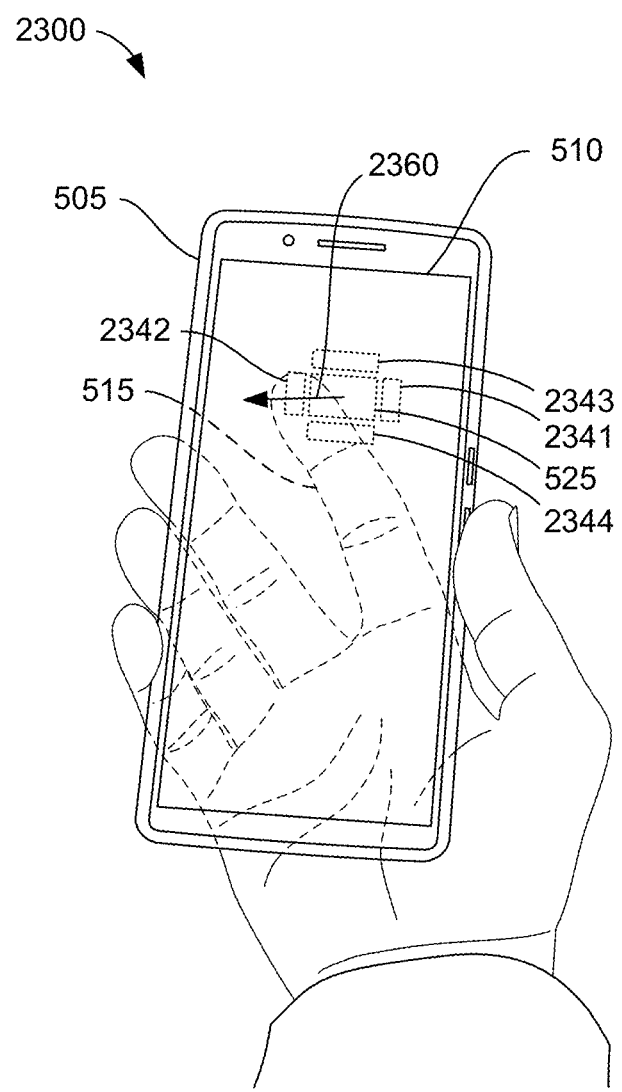
FIG. 23B shows an example of using a capacitive sensing mode and an ultrasonic sensing mode with a fingerprint sensor and one or more associated sensing electrodes positioned behind a back cover of an electronic device to detect finger gestures.

FIG. 23A shows an example of using a capacitive sensing mode and an ultrasonic sensing mode in a configuration 2300 with a fingerprint sensor 525 and one or more associated sensing electrodes 2341, 2342, 2343, 2344 positioned behind a back cover of an electronic device 505. Sensing electrodes 2341, 2342, 2343, 2344 may include underlying piezoelectric and electrode layers to form a sensor stack that may be used for capacitive sensing or for ultrasonic sensing in either the capacitive sensing mode or the ultrasonic sensing mode. Fingerprint sensor 525 may be configured to wake up or otherwise interact with the electronic device 505. Electronic device 505 may include a controller circuit 520 that may switch sensor 525 with a receiver bias electrode and/or sensing electrodes 2341, 2342, 2343, 2344 to operate between a capacitive sensing mode and/or an ultrasonic sensing mode as described above with respect to FIG. 5 and FIG. 6. The capacitive and/or ultrasonic sensing modes may be used to detect finger 515 and perform other functions, such as waking up electronic device 505, authenticating a user, or interacting with an application running on the applications processor 530 such as taking a picture while electronic device 505 is underwater. The sensor 525 with a receiver bias electrode and sensing electrodes 2341, 2342, 2343, 2344 may be configured to continue to sense and/or authenticate the user or perform other functions in response to the detection of finger gestures and motions of finger 515 such as tapping, double-tapping, swiping, pressing or other indicative motion of a such as a swipe gesture as depicted with arrow 2360 as illustrated in FIG. 23B. Additional ultrasonic and/or capacitive sensing electrodes (not shown) associated with the fingerprint sensor 525 may be located diagonally to fingerprint sensor 525 or at other locations with respect to fingerprint sensor 525 to further aid in gesture detection.

In some implementations, the back cover of a mobile or electronic device such as the electronic device 505 in the configuration 2300 shown in FIGS. 23A and 23B may be formed of any suitable material that may be acoustically coupled to the ultrasonic fingerprint sensor 525. For example, the back cover may be formed of one or more of glass, plastic, ceramic, sapphire, metal or metal alloy including titanium, aluminum or an aluminum alloy, or laminates thereof.

Alternatively or in addition to the capacitance and ultrasonic sensing methods shown and described with respect to FIGS. 15A-15C and the shake-and-wake operations with in-device accelerometers and angular rate sensors described above, piezoelectric signals from forces and sounds generated by a user interacting with the mobile device may be included in various aspects of hybrid wakeup. A user may touch, tap, rub, press, bend, flex, grip, squeeze or otherwise physically interact with the enclosure or display of a mobile device. The physical interactions with the mobile device may generate sounds or acoustic emissions that may generate surface charge in one or more of the piezoelectric layers associated with the fingerprint sensor and the sensing electrodes that are configured in the mobile device. The acoustically generated piezoelectric signals may in turn be detected in either the capacitive or ultrasonic sensing modes. In some implementations, physical interactions such as pressing, bending, flexing, gripping or squeezing the mobile device by a user may generate piezoelectric signals the applied forces that are detected and may trigger, initiate, or otherwise interact with one or more applications running on the mobile device. For example, gripping or squeezing the mobile device enclosure with a right-handed or left-handed grip may be detected to reduce inadvertent wakeups an unintended touch detection with devices having large displays and small or non-existent bezels.

In some implementations, the controller and one or more sensing electrodes may be configured to detect an acoustically generated piezoelectric signal in the capacitive sensing mode. The acoustically generated piezoelectric signals may originate from a tap, a rub, an acoustic emission or other physical interaction from a finger of a user interacting with the mobile device. For example, an ADC in the capacitive touch module operating in a capacitive sensing mode may detect and measure acoustically generated piezoelectric signals from a piezoelectric layer that is coupled to a capacitive sensing electrode and the ADC. The amplitude, wave shape or signature of the piezoelectric signal may satisfy an acceptance criterion such as a touch detection threshold and allow advancement to an ultrasonic sensing mode for detecting an object such as a finger or for imaging a finger for authentication. In some implementations, the controller and one or more sensing electrodes may be configured to detect and measure acoustically generated piezoelectric signals while operating in the ultrasonic sensing mode. For example, one or more pixel circuits in an ultrasonic sensor array may be reset and configured to detect any acoustically generated signals with an in-pixel peak detector. The detected signals may be clocked out and read to determine if the device should be woken up or another function initiated. When operating in the ultrasonic sensing mode, acoustically generated piezoelectric signals may be detected for initiating a device wakeup function or other functions without generating and transmitting an ultrasonic wave that is normally used for ultrasonic imaging.

In some implementations, finger detection may occur with a combination of passive listening and active imaging. During a finger detection process, detection of acoustically generated piezoelectric signals in a passive listening mode may occur at a nominal sampling rate on the order of 1 kHz. In parallel, an active ultrasonic sensing mode for ultrasonic wakeup detection with launching and detecting ultrasonic waves may occur at a different sampling rate, such as a rate between 1 and 100 Hz. Full or partial scans may be made during the active sensing mode. If either the passive listening mode or the active sensing mode (or both) detects the presence of a finger during the finger detection process, a finger verification process may be triggered. During the finger verification process, the finger may be imaged ultrasonically with a full scan and a determination made if the detected object is indeed a finger. An interrupt signal may be sent to the applications processor to wake up the applications process and run a fingerprint authentication process.

User-induced actions such as bending, flexing, gripping or squeezing the mobile device enclosure or display may result in piezoelectric signals that may be detected in either the capacitive sensing mode or the ultrasonic sensing mode from a fingerprint sensor that is coupled to the device enclosure or display. Detection of user-induced actions may result in one or more portions of the mobile device waking up or initiation of another function such as an authentication process or a screen manipulation. The physical pressing of a finger on the fingerprint sensor may result in a user-induced applied force or pressure on the piezoelectric layer that generates a piezoelectric signal for detection in either the capacitive or ultrasonic sensing modes and which may also result in one or more portions of the mobile device waking up or initiating another function.

With configurations such as that illustrated in FIGS. 18, 19, 21 and 22 of an electronic device 505 with a fingerprint sensor 525 positioned behind and coupled to a display 510 such as an LCD or OLED display, the ability to detect a finger touch or a finger lift by measuring a finger capacitance may be reduced. Piezoelectric signals generated from a physical interaction with the display may be detected when operating in the capacitive or ultrasonic sensing mode and serve as a first or second step in a wakeup process prior to imaging a finger ultrasonically and authenticating the fingerprint. For example, a tap, a rub or an acoustic emission from a user-induced action with a finger on the display may be detected through the display. Detection of a user-induced action by sensing an acoustically generated piezoelectric signal may cause other functions to be initiated such as returning to a home screen or lighting up a portion of the display.

With configurations such as that illustrated in FIGS. 23A-23B of an electronic device 505 having a back cover constructed from a metal or metal alloy such as titanium, aluminum or an aluminum alloy, the ability to detect a finger capacitance through the metal back cover for determining a finger touch or a finger lift event may be limited. Hybrid wakeup using a piezoelectric signal generated from a physical interaction may be detected when operating in the capacitive or ultrasonic sensing mode and serve as a first or second step in a wakeup process prior to imaging a finger ultrasonically and authenticating the fingerprint or performing another function. For example, a tap, a rub or an acoustic emission may be detected through the metal back cover from a user-induced action with a finger interacting with the mobile device and the mobile device may respond accordingly.

As most piezoelectric materials are pyroelectric in that surface charge is generated in response to a change in temperature, heat from a finger positioned against the metal back cover may generate a heat-induced piezoelectric signal from an ultrasonic fingerprint sensor coupled to the metal back cover that may be detected in either the capacitive or ultrasonic sensing mode. The detected heat-induced piezoelectric signal may satisfy an acceptance criterion such as a touch detection threshold and allow advancement to an ultrasonic sensing mode for detecting or imaging the finger.

Use of two or more spatially separated sensor pixels of an ultrasonic sensor array in a temporal measurement process may allow a determination of the origination of the acoustically generated piezoelectric signals or of the heat-induced piezoelectric signal. For example, a sound or an acoustic emission generated by a user interaction with the mobile device such as a tap or a touch on the display or back cover may be detected and the direction and distance from the user interaction to the sensor array may be determined by comparing one or more acquired piezoelectric signals at two different times. Subsequent measurements of acoustically generated piezoelectric signals or heat-induced piezoelectric signals may allow determination of one or more finger gestures such as a tap, double-tap, touch, swipe or press.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally in terms of functionality and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor or any conventional processor, controller, microcontroller or state machine. A processor may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, the structures disclosed in this specification and their structural equivalents thereof, or in any combination thereof. Implementations of the subject matter described in this specification may be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium, such as a non-transitory medium. The processes of a method or algorithm disclosed herein may be implemented in a processor-executable software module that may reside on a computer-readable medium. Computer-readable media include both computer storage media and communication media including any medium that may be enabled to transfer a computer program from one place to another. Storage media may be any available media that may be accessed by a computer. By way of example and not limitation, non-transitory media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those having ordinary skill in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein, if at all, to mean "serving as an example, instance or illustration." Any implementation described herein as "exemplary" is not necessarily to be construed as preferred or advantageous over other implementations.

Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, other implementations are within the scope of the following claims. In some cases, the actions recited in the claims may be performed in a different order and still achieve desirable results.

It will be understood that unless features in any of the particular described implementations are expressly identified as incompatible with one another or the surrounding context implies that they are mutually exclusive and not readily combinable in a complementary and/or supportive sense, the totality of this disclosure contemplates and envisions that specific features of those complementary implementations may be selectively combined to provide one or more comprehensive, but slightly different, technical solutions. It will therefore be further appreciated that the above description has been given by way of example only and that modifications in detail may be made within the scope of this disclosure.

What is claimed is:

1. A system comprising:
    a fingerprint sensor having one or more sensing electrodes; and
    a controller configured to:
        provide one or more first drive signals to the one or more sensing electrodes to configure the fingerprint sensor in a capacitive sensing mode, and
        provide one or more second drive signals to the one or more sensing electrodes to configure the fingerprint sensor in an ultrasonic sensing mode, the one or more second drive signals different from the one or more first drive signals,
    wherein the controller comprises an amplifier configured to provide the one or more second drive signals in the ultrasonic sensing mode, and be in a high-impedance state in the capacitive sensing mode.

2. The system of claim 1, wherein the controller is configured to configure the fingerprint sensor in the ultrasonic sensing mode based on the fingerprint sensor detecting a touch in the capacitive sensing mode.

3. The system of claim 2, further comprising a mobile device housing the fingerprint sensor, the mobile device configured to wake up from a sleep mode responsive to the fingerprint sensor detecting the touch in the capacitive sensing mode or in the ultrasonic sensing mode.

4. The system of claim 2, wherein the controller is further configured to provide, to an applications processor to perform fingerprint authentication, an interrupt signal representing that a finger corresponding to the touch is detected by the fingerprint sensor in the capacitive sensing mode.

5. The system of claim 2, wherein the controller is further configured to determine a touch detection threshold, the touch detection threshold based at least in part on a contact area of a finger in contact with the fingerprint sensor, the touch detection threshold capable of being adjusted during a fingerprint authentication process.

6. The system of claim 2, wherein the controller is further configured to report a finger lift event while operating in either the capacitive sensing mode or the ultrasonic sensing mode.

7. The system of claim 2, wherein the controller is further configured to determine a temperature corresponding to the fingerprint sensor, the detection of the touch in the capacitive sensing mode based at least in part on the temperature.

8. The system of claim 1, wherein the controller comprises circuitry to generate a buffered first drive signal provided to at least one sensing electrode of the fingerprint sensor when the fingerprint sensor is in the capacitive sensing mode.

9. The system of claim 1, wherein the fingerprint sensor comprises one or more piezoelectric micromechanical ultrasonic transducers (PMUTs), one or more capacitive micromachined ultrasonic transducers (CMUTs), one or more layers of polyvinylidene fluoride (PVDF), or one or more layers of polyvinylidene fluoride-trifluoroethylene (PVDF-TrFE).

10. The system of claim 1, wherein the one or more sensing electrodes of the fingerprint sensor comprise a first electrode and a second electrode, the first electrode coupled to provide a first signal to operate the fingerprint sensor in the capacitive sensing mode, the second electrode coupled to provide a second signal to operate the fingerprint sensor in the ultrasonic sensing mode.

11. The system of claim 10, wherein the first electrode and the second electrode are positioned under a cover glass of a mobile device or under a back cover of the mobile device.

12. The system of claim 10, wherein the first electrode and the second electrode are positioned under a display of a display device, the display of the display device indicating a position of the fingerprint sensor when a finger touch is detected in either the capacitive sensing mode or the ultrasonic sensing mode.

13. The system of claim 10, wherein the first electrode is a touchscreen electrode.

14. The system of claim 10, wherein at least one of the first electrode or the second electrode is configured to detect a finger gesture.

15. The system of claim 1, wherein the controller is configured to perform one or more of:
configuring the one or more sensing electrodes in the ultrasonic sensing mode upon indication of a change in motion or a change in orientation from an in-device accelerometer or an in-device gyroscope,
adjusting a finger detection rate in the capacitive sensing mode or the ultrasonic sensing mode upon indication of a change in motion or a change in orientation from an in-device accelerometer or an in-device gyroscope, or
adjusting a touch detection threshold upon indication of a change in motion or a change in orientation from an in-device accelerometer or an in-device gyroscope.

16. The system of claim 1, wherein the controller is configured to detect an acoustically generated piezoelectric signal in the capacitive sensing mode, the acoustically generated piezoelectric signal originating from a tap, a rub or an acoustic emission from a finger.

17. A method for operating a fingerprint sensor, the method comprising:
operating a fingerprint sensor in a capacitive sensing mode;
determining, by the fingerprint sensor operating in a capacitive sensing mode, that an object has touched a sensing electrode;
configuring, by the controller, the fingerprint sensor to function in an ultrasonic sensing mode;
determining, using the fingerprint sensor in the ultrasonic sensing mode, that the object that has touched the sensing electrode is a finger; and
instructing an applications processor to authenticate a fingerprint of the finger,
wherein configuring the fingerprint sensor to function in the ultrasonic sensing mode comprises driving an amplifier to provide a drive signal to an electrode of the fingerprint sensor,
wherein operating the fingerprint sensor in the capacitive sensing mode comprises controlling an amplifier to operate in a high-impedance state.

18. The method of claim 17, wherein instructing the applications processor to authenticate the fingerprint comprises asserting an interrupt signal representing that the object is determined to be a finger using the fingerprint sensor in the ultrasonic sensing mode.

19. A non-transitory computer readable medium storing instructions executable by one or more processors of a controller to cause a method to be performed for configuring a fingerprint sensor, the method comprising:
configuring the fingerprint sensor to function in a capacitive sensing mode;
determining that an object has touched a sensing electrode using the fingerprint sensor in the capacitive sensing mode;
configuring the fingerprint sensor to function in an ultrasonic sensing mode; determining that the object that has touched the sensing electrode is a finger using the fingerprint sensor in the ultrasonic sensing mode; and
instructing an applications processor to authenticate a fingerprint of the finger,
wherein configuring the fingerprint sensor to function in the ultrasonic sensing mode comprises driving an amplifier to provide a drive signal to an electrode of the fingerprint sensor, and configuring the amplifier to operate in a high-impedance state in the capacitive sensing mode.

20. The non-transitory computer readable medium of claim 19, wherein instructing the applications processor to authenticate the fingerprint comprises asserting an interrupt signal representing that the object is determined to be a finger using the fingerprint sensor in the ultrasonic sensing mode.

21. The non-transitory computer readable medium of claim 19, the method further comprising returning to a home screen or waking up a mobile device when the fingerprint of the finger has been authenticated.

* * * * *